US008467094B2

(12) United States Patent
Takahashi

(10) Patent No.: US 8,467,094 B2
(45) Date of Patent: Jun. 18, 2013

(54) IMAGE FORMING APPARATUS, CONTROL METHOD THEREFOR, AND PROGRAM

(75) Inventor: Katsuyuki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 12/781,942

(22) Filed: May 18, 2010

(65) Prior Publication Data
US 2010/0321711 A1 Dec. 23, 2010

(30) Foreign Application Priority Data

Jun. 18, 2009 (JP) ................................. 2009-145823

(51) Int. Cl.
G06F 15/02 (2006.01)
G06K 15/00 (2006.01)
G03G 15/00 (2006.01)

(52) U.S. Cl.
USPC ................ 358/1.9; 358/1.14; 399/81; 399/82

(58) Field of Classification Search
USPC ................ 358/1.9, 1.14; 399/70, 81, 82, 410, 399/299, 303, 366
See application file for complete search history.

(56) References Cited

U.S. PATENT DOCUMENTS

| 5,673,086 | A | 9/1997 | Fukuoka et al. |
| 6,236,464 | B1 | 5/2001 | Kohtani et al. |
| 6,708,018 | B2 | 3/2004 | Sato et al. |
| 2002/0176725 | A1 | 11/2002 | Sato et al. |
| 2004/0022566 | A1 | 2/2004 | Matsuyama et al. |
| 2008/0124112 | A1 | 5/2008 | Soma et al. |
| 2008/0279578 | A1* | 11/2008 | Monde ............................ 399/70 |
| 2009/0152788 | A1 | 6/2009 | Kawaguchi |
| 2009/0237706 | A1* | 9/2009 | Miyajima ..................... 358/1.14 |
| 2009/0255971 | A1 | 10/2009 | Nakamaki et al. |
| 2009/0297240 | A1 | 12/2009 | Dobbertin et al. |

FOREIGN PATENT DOCUMENTS

| JP | 07-084483 A | 3/1995 |
| JP | 2002-347987 A | 12/2002 |
| JP | 2005-199447 A | 7/2005 |
| JP | 2005-331968 A | 12/2005 |
| JP | 2008-158074 A | 7/2008 |
| JP | 2008-219573 A | 9/2008 |
| JP | 2008-271118 A | 11/2008 |

OTHER PUBLICATIONS

Office Action—Japanese Patent Application No. 2009-145823, Japanese Patent Office, Apr. 12, 2013.

* cited by examiner

Primary Examiner — Charlotte M Baker
(74) Attorney, Agent, or Firm — Fitzpatrick, Cella, Harper & Scinto

(57) ABSTRACT

This invention provides an image forming apparatus, control method therefor, and program for executing efficient image formation while ensuring user friendliness. To accomplish this, the image forming apparatus according to this invention permits changing an image forming condition during execution of an operation of forming an image while conveying a plurality of sheets each on which the image is to be formed at the first interval, and restricts changing the image forming condition during execution of the operation of forming an image while conveying the plurality of sheets at the second interval shorter than the first interval.

8 Claims, 17 Drawing Sheets

IMAGE FORMING APPARATUS, CONTROL METHOD THEREFOR, AND PROGRAM

BACKGROUND OF THE INVENTION

1. Field of the Invention

The present invention relates to an image forming apparatus, control method therefor, and program.

2. Description of the Related Art

There has conventionally been known an image forming apparatus which forms (prints) an image while shortening the interval between conveyed sheets in order to quickly output sheets (see Japanese Patent Laid-Open No. 2002-347987).

Some conventional image forming apparatus accept a setting from a user via an operation unit during an image forming operation to change an image forming condition such as the density value. When the user changes an image forming condition, the image forming apparatus performs image processing reflecting the changed image forming condition for image data, and forms an image on a sheet based on the image data. An image forming apparatus of this type allows the user to adjust the quality of an output image by changing image forming conditions while checking an image formed on a sheet. This image forming apparatus is highly user friendly.

However, when the conventional image forming apparatus forms an image while shortening the interval between conveyed sheets, it may be too late to reflect a changed image forming condition during the interval between sheets. For example, when the user changes the density value during the image forming operation, the image forming apparatus needs to set a parameter concerning the density in image processing during the interval between sheets. Therefore, the interval between sheets cannot be satisfactorily shortened, failing to execute efficient image formation.

By enhancing the processing capability of the image forming apparatus, the interval between sheets may be shortened while reflecting image forming conditions. In this case, however, the cost of the image forming apparatus rises.

SUMMARY OF THE INVENTION

The present invention has been made to solve the above-described problems, and provides a mechanism capable of executing efficient image formation while ensuring user friendliness.

One aspect of the present invention provides an image forming apparatus comprising: a setting unit that sets an image forming condition for an image to be formed on a sheet; a conveying unit that, when conveying a plurality of sheets each on which the image is to be formed, conveys the plurality of sheets at a first interval or a second interval shorter than the first interval; an image forming unit that forms an image on a sheet conveyed by the conveying unit, based on the image forming condition set by the setting unit; and a control unit that permits changing the image forming condition by the setting unit during execution of an operation of forming an image by the image forming unit while the conveying unit conveys the plurality of sheets at the first interval, and restricts changing the image forming condition by the setting unit during execution of the operation of forming an image by the image forming unit while the conveying unit conveys the plurality of sheets at the second interval.

Another aspect of the present invention provides an image forming apparatus control method comprising: causing a setting unit to set an image forming condition for an image to be formed on a sheet; causing a conveying unit to, when conveying a plurality of sheets on which the image is to be formed, convey the plurality of sheets at a first interval or a second interval shorter than the first interval; causing an image forming unit to form an image on a sheet conveyed in the causing a conveying unit to convey the plurality of sheets, based on the image forming condition set in the causing a setting unit to set an image forming condition; and causing a control unit to permit changing the image forming condition in the causing a setting unit to set an image forming condition, during execution of an operation of forming an image in the causing an image forming unit to form an image, while conveying the plurality of sheets at the first interval in the causing a conveying unit to convey the plurality of sheets, and restrict changing the image forming condition in the causing a setting unit to set an image forming condition, during execution of the operation of forming an image in the causing an image forming unit to form an image, while conveying the plurality of sheets at the second interval in the causing a conveying unit to convey the plurality of sheets.

According to the present invention, efficient image formation can be executed while ensuring user friendliness.

Further features of the present invention will become apparent from the following description of exemplary embodiments (with reference to the attached drawings).

DESCRIPTION OF THE EMBODIMENTS

A preferred embodiment of the present invention will be described below. The embodiment to be described below would help understand various concepts such as superordinate, intermediate, and subordinate concepts of the invention. The technical scope of the present invention is defined by the scope of the claims, and is not limited by the following embodiment.

<Overall Arrangement of Image Forming Apparatus>

Figure 1:
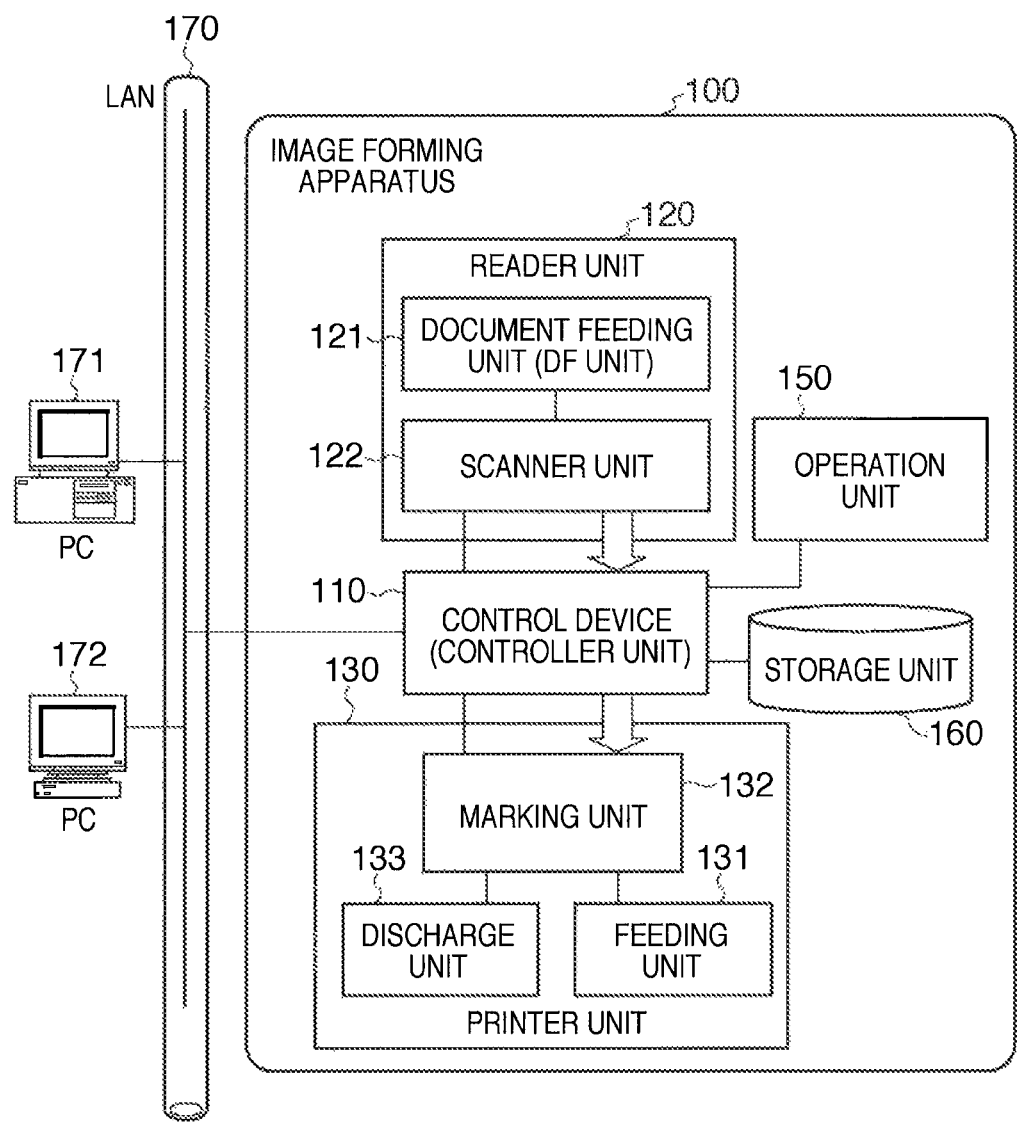
FIG. 1 is a block diagram exemplifying the arrangement of an image forming apparatus according to an embodiment of the present invention.

The embodiment of the present invention will be described with reference to FIGS. 1 to 19. FIG. 1 is a block diagram exemplifying the arrangement of an image forming apparatus according to the embodiment of the present invention. An image forming apparatus 100 is connected to host computers 171 and 172 via a LAN 170 such as an Ethernet® LAN. Note that the number of host computers connected to the LAN 170 is arbitrary.

The image forming apparatus 100 includes a reader unit 120 that performs image data reading processing, a printer unit 130 which performs image data output processing, an operation unit 150, a storage unit 160, and a controller unit (control unit) 110. The operation unit 150 serving as an input device includes a keyboard for an operation related to inputting/outputting image data, and a liquid crystal panel for displaying and setting image data and various functions. The storage unit 160 can store image data read by controlling the reader unit 120, and image data generated from code data received from the host computers 171 and 172 via the LAN 170. The controller unit 110 is formed from a single electronic component and controls the operations of other connected components.

The reader unit 120 includes a document feeding unit 121 and scanner unit 122. The document feeding unit 121 feeds and conveys a document. The scanner unit 122 optically reads a document image and converts it into image data which is an electrical signal.

The printer unit 130 includes a feeding unit 131, marking unit 132, and discharge unit 133. The feeding unit 131 includes a plurality of feeding cassettes which store printing sheets (printing materials or sheets). The marking unit 132 transfers and fixes image data onto a printing sheet. The discharge unit 133 sorts and staples printed sheets, and discharges them to the outside.

The controller unit 110 has a copy function of controlling the reader unit 120 to read image data of a document, and controlling the printer unit 130 to output the image data onto a printing sheet. The controller unit 110 also has a scanner function of controlling the reader unit 120 to convert read image data into code data, and transmit the code data to the host computers 171 and 172 via the LAN 170. Further, the controller unit 110 has various other functions such as a print function of converting code data received from the host computer via the LAN 170 into image data and outputting the image data to the printer unit 130.

<Arrangements of Reader Unit 120 and Printer Unit 130>

Figure 2:
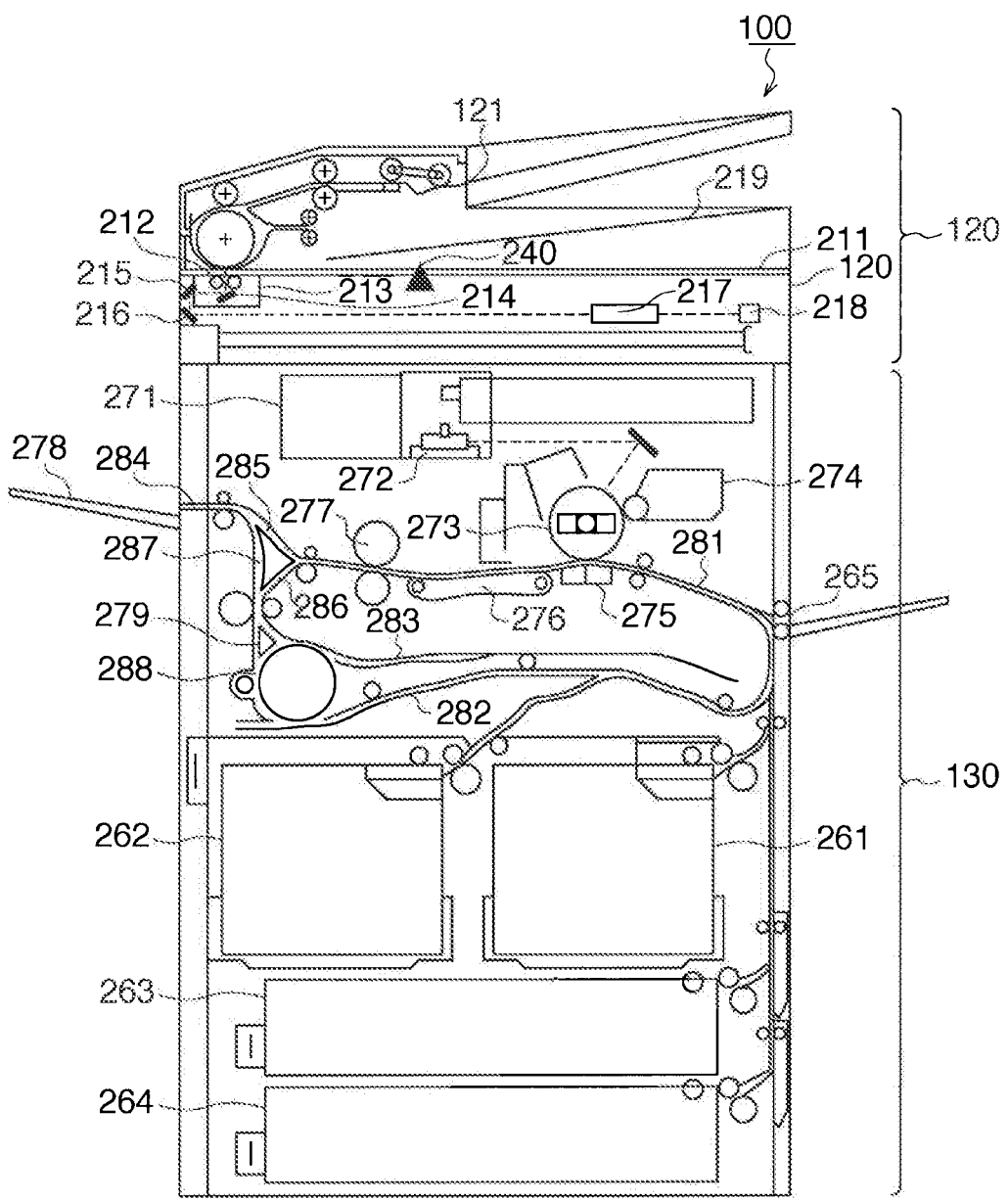
FIG. 2 is a sectional view showing a reader unit and printer unit in the image forming apparatus according to the embodiment of the present invention.

A copy operation in the image forming apparatus will be explained with reference to FIG. 2. FIG. 2 is a sectional view showing the reader unit and printer unit in the image forming apparatus according to the embodiment of the present invention.

In the reader unit 120, document sheets stacked on the document feeding unit 121 are fed to a platen glass 211 one by one from the top in the stacking order. In the scanner unit 122, a lamp 212 is turned on, and an optical unit 213 starts moving. The optical unit 213 scans the document sheet by irradiating it with light from below it. The light reflected by the document sheet is guided to a CCD image sensor (to be referred to as a "CCD") 218 via mirrors 214, 215, and 216 and a lens 217. The CCD 218 reads an image on the scanned document sheet, generating image data. The image data undergoes predetermined image processing in the scanner unit 122 and is transferred to the controller unit 110. After the end of a predetermined reading operation in the scanner unit 122, the document sheet on the platen glass 211 is discharged to a discharge tray 219.

When the document feeding unit 121 has a document sheetfed function, stacked document sheets pass a document sheetfed position 240 at a predetermined speed. In this case, the optical unit 213 moves to the document sheetfed position 240, and the lamp 212 irradiates document sheets conveyed at a constant speed with light. The CCD 218 reads an image on each document sheet to generate image data and transfer it to the controller unit 110.

In the printer unit 130, a laser beam emitting unit 272 emits a laser beam corresponding to image data output from the controller unit 110, and irradiates a photosensitive drum 273 with the laser beam. A laser driver 271 drives the laser beam emitting unit 272. An electrostatic latent image corresponding to the laser beam is formed on the photosensitive drum 273. A developing unit 274 performs development processing to apply a developer to the electrostatic latent image on the photosensitive drum 273.

At the timing when irradiation with the laser beam starts, a printing sheet is fed from one of cassettes 261, 262, 263, and 264 and a manual feeding source 265. The fed printing sheet passes through a conveyance path 281 and reaches a transfer unit 275. The transfer unit 275 transfers, to the printing sheet, the developer attached to the photosensitive drum 273. A conveyance belt 276 conveys the printing sheet bearing the image data to a fixing unit 277. The fixing unit 277 fixes the image data onto the printing sheet by heating and pressurization. The printing sheet having passed through the fixing unit 277 passes through conveyance paths 285 and 284 and is discharged to a discharge bin 278. When discharging the printing sheet to the discharge bin 278 after reversing its printed surface, the printing sheet is guided to conveyance paths 286 and 288. Then, the printing sheet passes through a conveyance path 287 and the conveyance path 284 in an opposite direction, and is discharged to the discharge bin 278. The image forming apparatus 100 can use the discharge unit 133 (not shown in FIG. 2) to, for example, bundle discharged printing sheets, sort them, and staple the sorted printing sheets.

When printing image data on the two surfaces of a printing sheet, the printing sheet having passed through the fixing unit 277 is guided by a flapper 279 from the conveyance path 286 to a conveyance path 283. After that, the printing sheet is conveyed in an opposite direction, and guided by the flapper 279 to the conveyance path 288 and a refeed conveyance path 282. Similar to the above-described processing, the printing sheet guided to the refeed conveyance path 282 passes through the conveyance path 281 and is fed to the transfer unit 275. Image data is then transferred again onto a surface of the printing sheet opposite to the image-bearing surface.

<Arrangement of Controller Unit 110>

Figure 3:
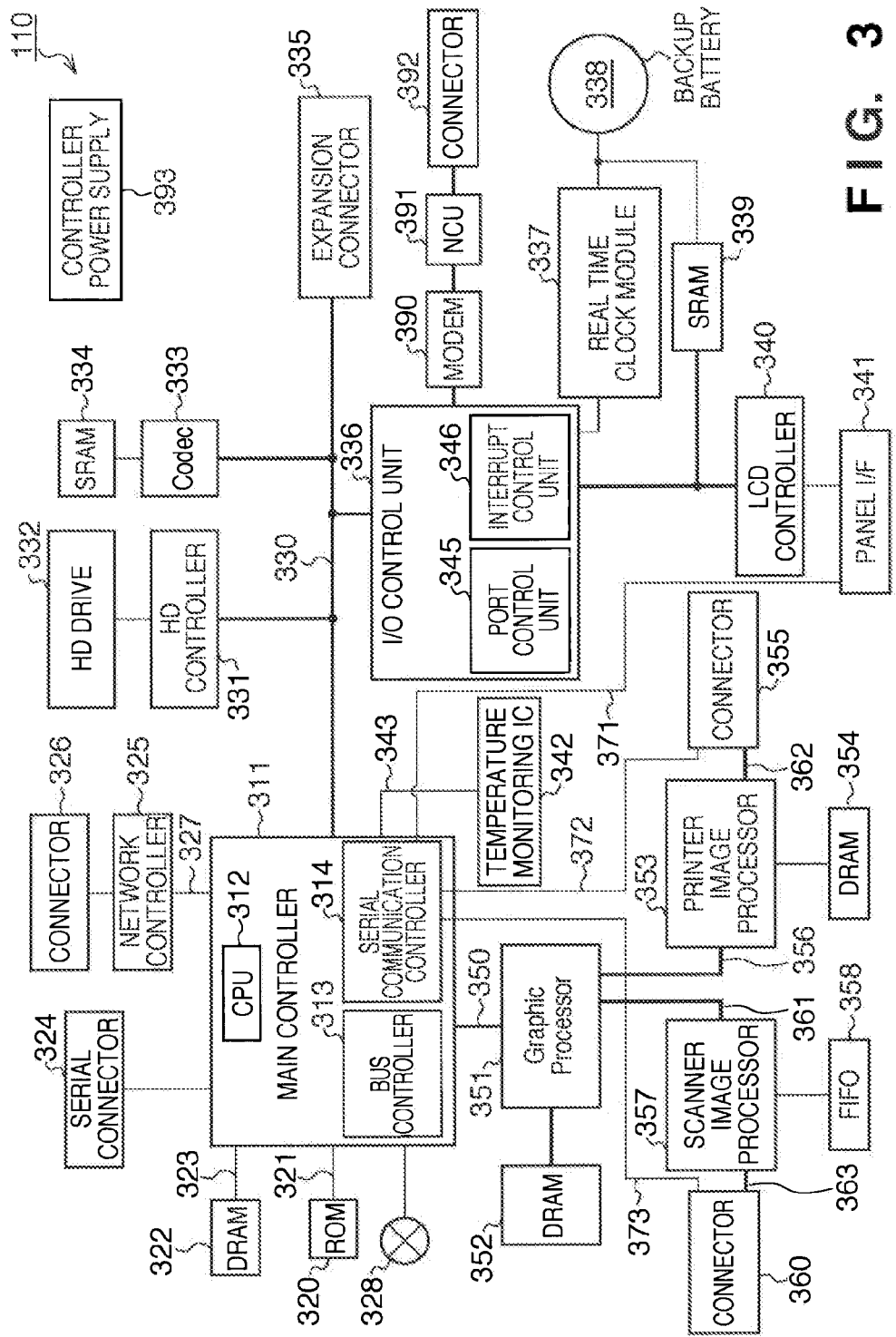
FIG. 3 is a block diagram exemplifying the arrangement of a controller unit in the image forming apparatus according to the embodiment of the present invention.

FIG. 3 is a block diagram exemplifying the arrangement of the controller unit in the image forming apparatus according to the embodiment of the present invention.

A main controller 311 in the controller unit 110 includes, for example, a CPU 312, bus controller 313, and serial communication controller 314. The CPU 312 and bus controller 313 control the overall operation of the controller unit 110. The CPU 312 operates based on a program loaded from a ROM 320 via an I/F (interface) 321. The program describes even an operation of interpreting PDL (Page Description Language) code data received from the host computers 171 and 172, and rasterizing it into image data. The bus controller 313 controls transfer of data input/output via each I/F, and performs bus arbitration and DMA data transfer control. The serial communication controller 314 transmits/receives control commands between the CPUs of the reader unit 120 and printer unit 130 via I/Fs 372 and 373 (serial buses). The serial communication controller 314 controls communication with the operation unit 150 for inputs from the touch panel and hard keys (ten-key pad) of the operation unit 150.

A DRAM 322 is connected to the main controller 311 via an I/F 323. The DRAM 322 is used as a work area for the operation of the CPU 312, and an area for accumulating image data.

A network controller 325 is connected to the main controller 311 via an I/F 327 and to an external network via a connector 326. The external network is generally Ethernet®.

A serial connector 324 is connected to the main controller 311 via a serial bus, and used for communication between the main controller 311 and an external device. The serial bus is generally a USB bus.

A fan 328 is connected to the main controller 311 and used to cool the controller unit 110.

A temperature monitoring IC 342 is connected to the main controller 311 via a serial bus 343. The temperature monitoring IC 342 is used for control of the fan 328, temperature correction of a real time clock module 337, and the like.

An expansion connector 335 for connecting an expansion board, an I/O control unit 336, an HD controller 331, and a codec 333 are connected to a general-purpose high-speed bus 330. The general-purpose high-speed bus is generally a PCI bus.

The codec 333 compresses raster image data accumulated in the DRAM 322 in accordance with a scheme such as MH, MR, MMR, JBIG, or JPEG. Also, the codec 333 decompresses compressed/accumulated code data into raster image data.

An SRAM 334 is used as the temporary work area of the codec 333. Data transfer between the SRAM 334 and the DRAM 322 is controlled by the bus controller 313 and implemented by DMA transfer.

The HD controller 331 controls a connected external storage device. In the embodiment, a hard disk (HD) drive 332 is connected to the HD controller 331. The HD drive 332 is used to store programs and image data.

The I/O control unit 336 includes a port control unit 345 and interrupt control unit 346, and communicates with an LCD controller 340 and a MODEM (modem) 390.

A panel I/F 341 is connected to the LCD controller 340, and functions as an I/F for presenting a display on the liquid crystal screen of the operation unit 150. The panel I/F 341 is connected to the main controller 311 via an I/F 371, and allows inputs from keys (soft keys) displayed on the touch panel of the operation unit 150 and from hard keys.

The real time clock module 337 provides a function of updating and saving date & time information managed in the device. The real time clock module 337 is connected to a backup battery 338 and keeps holding the information even after the image forming apparatus 100 is turned off.

An SRAM 339 stores user modes, various kinds of setting information, file management information of the HD drive 332, and the like. The SRAM 339 is connected to the backup battery 338 and keeps holding the information as a nonvolatile memory even after the image forming apparatus 100 is turned off.

A graphic processor 351 performs processing such as image rotation, image scaling, color space conversion, binarization, scanner image input, or printer image output for image data accumulated in the DRAM 322. A DRAM 352 is used as the temporary work area of the graphic processor 351. The graphic processor 351 is connected to the main controller 311 via an I/F 350. Data transfer between the graphic processor 351 and the DRAM 322 is controlled by the bus controller 313 and implemented by DMA transfer.

Connectors 355 and 360 are connected to the printer unit 130 and reader unit 120, respectively. The connector 355 is connected to the main controller 311 via the I/F 372 and to a printer image processor 353 via an I/F 362. The connector 360 is connected to the main controller 311 via the I/F 373 and to a scanner image processor 357 via an I/F 363.

The scanner image processor 357 is connected to the reader unit 120 via the connector 360 and to the graphic processor 351 via an I/F 361 (scanner bus). The scanner image processor 357 has a function of performing predetermined image processing for image data received from the reader unit 120. The scanner image processor 357 has a function of outputting, to the I/F 361 (scanner bus), a control signal generated based on a video control signal received from the reader unit 120. A FIFO 358 connected to the scanner image processor 357 executes line correction for a video signal sent from the reader unit 120.

The printer image processor 353 is connected to the printer unit 130 via the connector 355 and to the graphic processor 351 via a printer bus 356. The printer image processor 353 has a function of performing predetermined image processing for image data output from the graphic processor 351 and outputting the processed image data to the printer unit 130. The printer image processor 353 also has a function of outputting, to the I/F 362 (printer bus), a control signal generated based on a video control signal received from the printer unit 130.

A DRAM 354 is connected to the printer image processor 353 and used to delay a video signal for a predetermined time.

When transferring raster image data rasterized in the DRAM 322 to the printer unit, the bus controller 313 controls the transfer processing. At this time, the data is DMA-transferred to the printer unit 130 via the graphic processor 351, printer image processor 353, and connector 355.

The modem 390 is connected to the I/O control unit 336 and an NCU (Network Control Unit) 391. The modem 390 modulates a signal when transmitting FAX data to a PSTN (Public Switched Telephone Network) via a connector 392, and demodulates a signal when receiving FAX data from the PSTN.

When the image forming apparatus 100 receives and prints FAX data, the NCU 391 and modem 390 demodulate data input from the PSTN. The main controller 311 processes the data via the I/O control unit 336, rasterizing the data in the DRAM 322. The resultant data is DMA-transferred to the printer unit 130 via the graphic processor 351, printer image processor 353, and connector 355 under the control of the bus controller 313.

When transmitting to the PSTN FAX data obtained by scanning from the image forming apparatus 100, a video signal from the reader unit 120 passes through the connector 360 and scanner image processor 357. The video signal is transferred to the main controller 311 via the graphic processor 351. The data is sent to the modem 390 and NCU 391 via the I/O control unit 336, modulated, and then output to the PSTN.

Details of the main controller 311, scanner image processor 357, printer image processor 353, and graphic processor 351 in the controller unit 110 will be explained.

(Main Controller 311)

Figure 4:
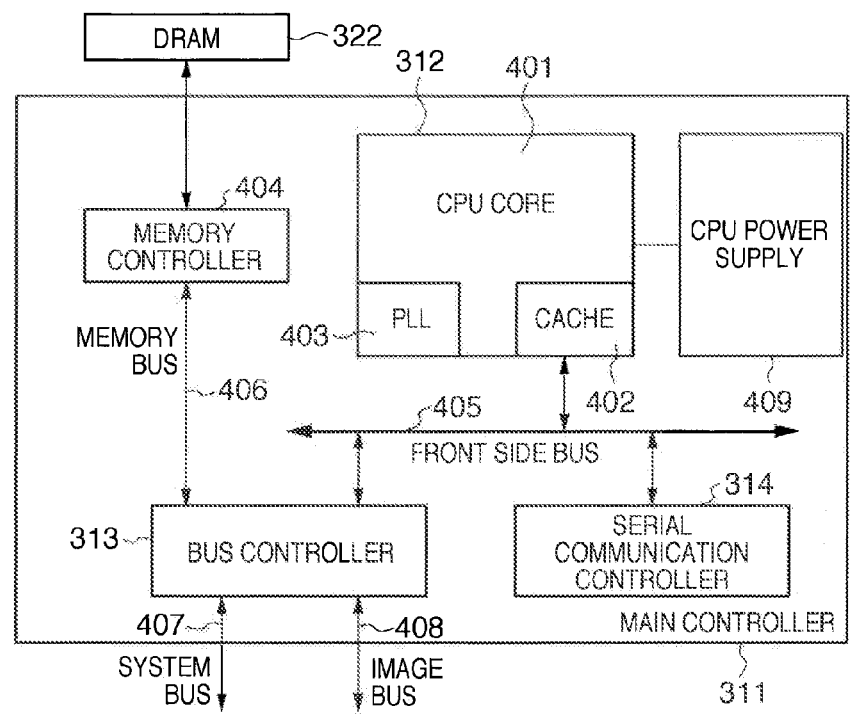
FIG. 4 is a block diagram exemplifying the arrangement of a main controller in the image forming apparatus according to the embodiment of the present invention.

FIG. 4 is a block diagram exemplifying the arrangement of the main controller 311 in the image forming apparatus 100 according to the embodiment of the present invention. The main controller 311 includes a memory controller 404 and CPU power supply 409 in addition to the CPU 312, bus controller 313, and serial communication controller 314 shown in FIG. 3.

The CPU 312 of the main controller 311 includes a cache (instruction cache and data cache) 402 and a PLL (Phase Locked Loop) 403 in a CPU core 401. The PLL 403 is used to multiply the system clock and generate a high-speed CPU core operating clock. The CPU core 401 and bus controller 313 are connected via a front side bus 405. The memory controller 404 and bus controller 313 are connected via a memory bus 406. The memory controller 404 controls data read/write from/in the DRAM 322.

The CPU power supply 409 is arranged outside the CPU 312. The CPU power supply 409 decreases the voltage of power supplied from a controller power supply 393, and supplies the power to the CPU core 401. The CPU power supply 409 can supply powers at a plurality of voltage values to the CPU core 401 in accordance with an instruction from the CPU 312. To enhance the processing capability of the CPU 312, the multiplication factor of the PLL 403 needs to be increased (for example, to 4) to increase the frequency of the CPU core operating clock supplied to the CPU core 401. At this time, the operating voltage of the CPU core 401 needs to be raised for a higher operating clock frequency of the CPU core 401, so a voltage applied by the CPU power supply 409 is raised. To the contrary, when the processing capability of the CPU 312 need not be so high and power consumption of the CPU 312 is to be reduced, the multiplication factor of the PLL 403 needs to be decreased (for example, to 1). At this time, a voltage applied by the CPU power supply 409 is decreased.

The bus controller 313 is connected to an external bus, and allows access from the CPU 312 to an external device and data read/write from/in the DRAM 322 by the external device.

(Scanner Image Processor 357)

Figure 6:
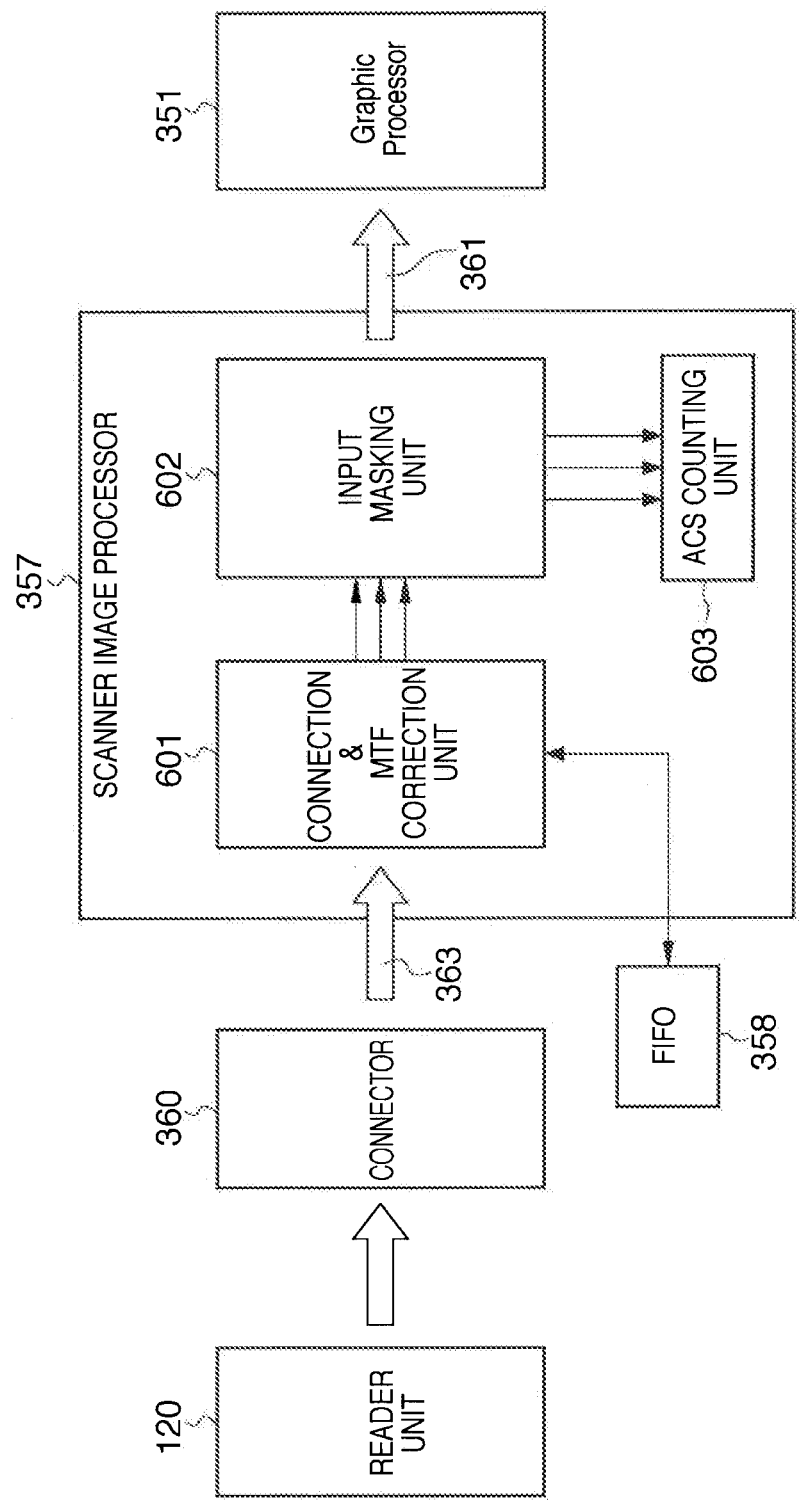
FIG. 6 is a block diagram exemplifying the arrangement of the scanner image processor of the controller unit in the image forming apparatus according to the embodiment of the present invention.

FIG. 6 is a block diagram exemplifying the arrangement of the scanner image processor 357 of the controller unit 110 in the image forming apparatus 100 according to the embodiment of the present invention.

The scanner image processor 357 receives an image signal sent from the reader unit 120 via the connector 360. A connection & MTF correction unit 601 in the scanner image processor 357 adjusts the delay amount of each line for the image signal in accordance with the reading speed, and corrects the changed MTF in accordance with the reading speed. When the CCD 218 is a 3-line CCD, the connection & MTF correction unit 601 corrects the timings of signals so that the reading positions of three lines match each other. For the image signal after correcting the reading position timing, an input masking unit 602 corrects the spectral characteristics of the CCD 218, lamp 212, and mirrors 214, 215, and 216. The FIFO 358 is used as a line delay buffer.

An output from the input masking unit 602 is transmitted to an ACS counting unit 603 which performs auto color selection, and the graphic processor 351.

(Printer Image Processor 353)

Figure 7:
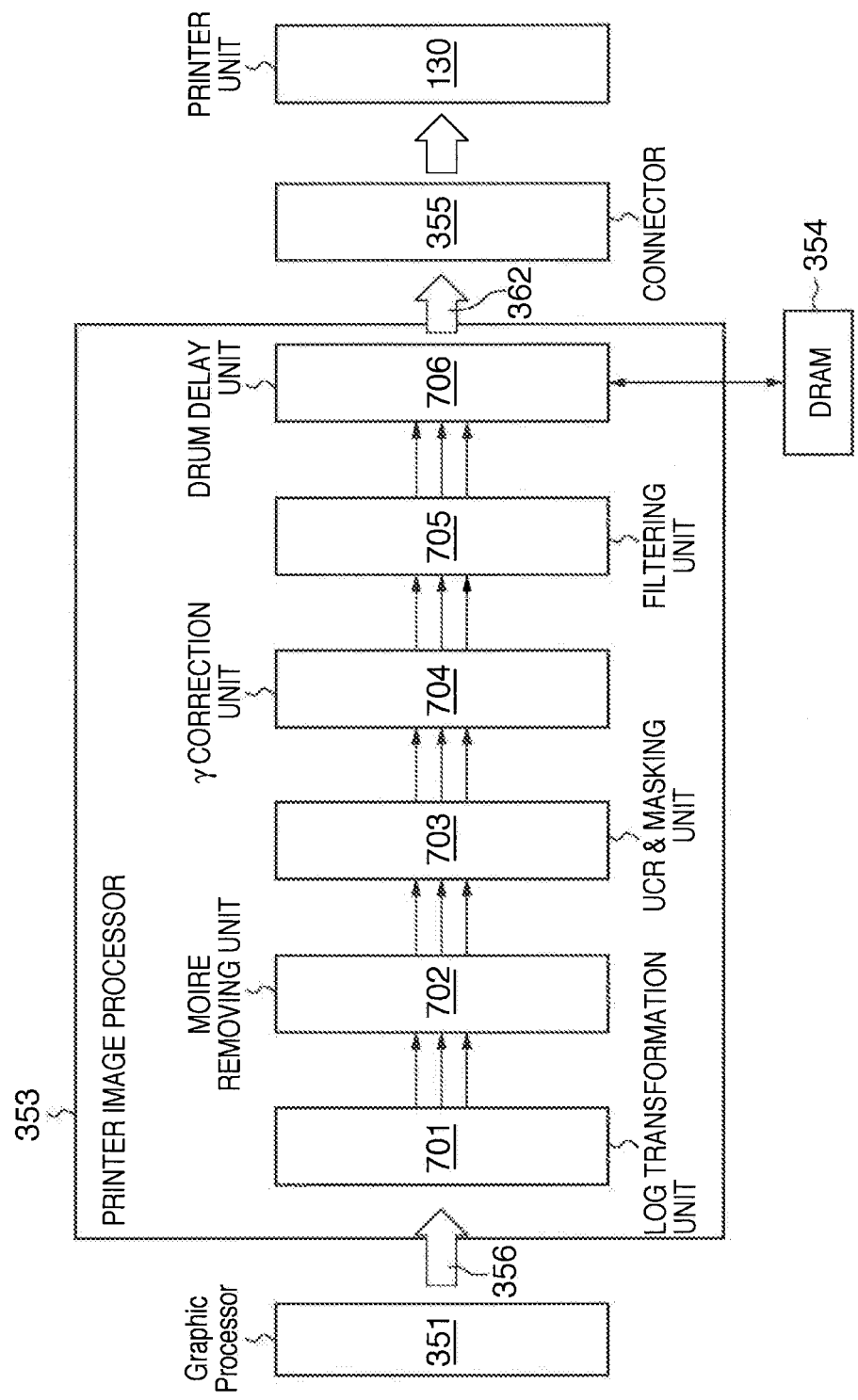
FIG. 7 is a block diagram exemplifying the arrangement of the printer image processor of the controller unit in the image forming apparatus according to the embodiment of the present invention.

FIG. 7 is a block diagram exemplifying the arrangement of the printer image processor 353 of the controller unit 110 in the image forming apparatus 100 according to the embodiment of the present invention.

A LOG transformation unit 701 receives image signals sent from the graphic processor 351 via the printer bus 356. The LOG transformation unit 701 converts the image signals from RGB signals into CMY signals by LOG transformation. A moire removing unit 702 removes moire from the image signals. Based on the moire-removed CMY signals, a OCR & masking unit 703 generates CMYK signals by UCR processing. The resultant signals are corrected into signals compliant with printer output by masking processing. A γ correction unit 704 executes density adjustment for the signals. A filtering unit 705 performs smoothing or edge processing.

The printer image processor 353 temporarily accumulates CMYK image signals in the DRAM 354 in order to correct image signals by a drum delay unit 706 based on the distance between different photosensitive drums. The corrected image signals are output to the printer unit 130 via the connector 355.

(Graphic Processor 351)

Figure 8:
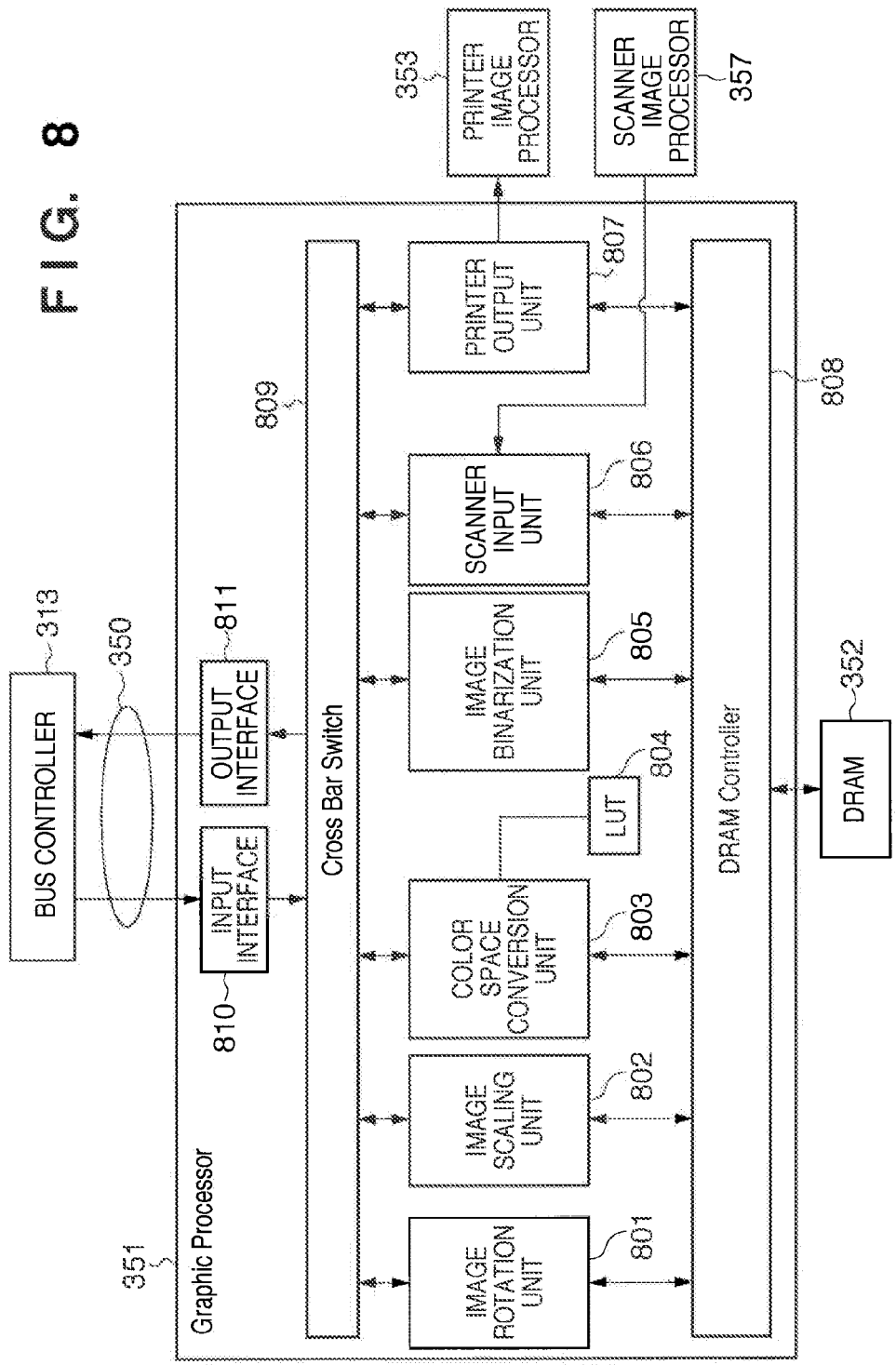
FIG. 8 is a block diagram exemplifying the arrangement of the graphic processor of the controller unit in the image forming apparatus according to the embodiment of the present invention.

FIG. 8 is a block diagram exemplifying the arrangement of the graphic processor 351 of the controller unit 110 in the image forming apparatus 100 according to the embodiment of the present invention. The graphic processor 351 includes modules for performing image rotation, image scaling, color space conversion, binarization, scanner image input, and printer image output.

The DRAM 352 is used as a temporary work area for each module via a DRAM controller 808. The DRAM controller 808 statistically assigns work areas of the DRAM 352 to respective modules so that work areas used by the modules do not overlap each other.

The graphic processor 351 is connected to the bus controller 313 of the main controller 311 via the I/F 350. Data transfer between the graphic processor 351 and the DRAM 322 is controlled by the bus controller 313 and implemented by DMA transfer.

The bus controller 313 performs control to set a mode or the like in each module of the graphic processor 351, and timing control to transfer image data to each module.

An input interface 810 inputs image data input via the I/F 350 to a cross bar switch 809. The graphic processor 351 handles binary raster image data, multilevel raster image data, JPEG-compressed data, and the like as image data formats. When input image data is a JPEG image, the input interface 810 converts it into raster image data and outputs the raster image data to the cross bar switch 809.

An output interface 811 outputs image data input from the cross bar switch 809 to the I/F 350. The format of image data input from the cross bar switch 809 is raster image data. The output interface 811 can JPEG-compress the image data and output the compressed image data to the I/F 350.

<Arrangement of Operation Unit 150>

Figure 5:
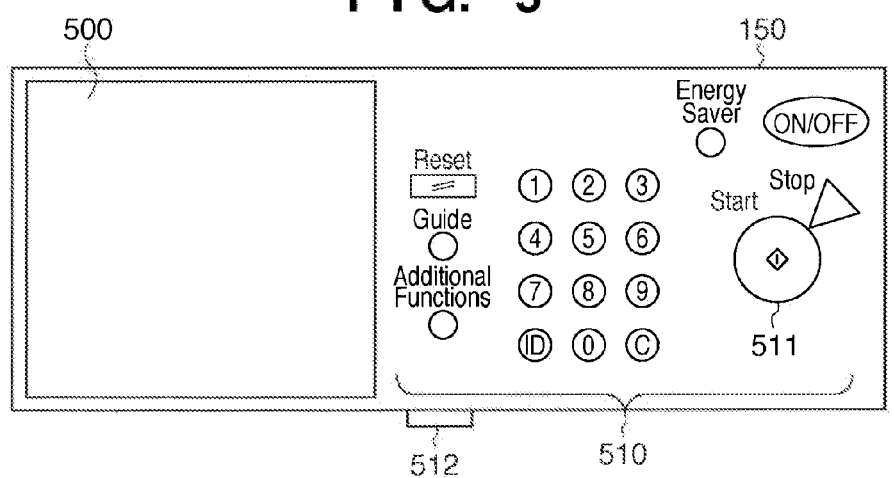
FIG. 5 is a view exemplifying the arrangement of an operation unit in the image forming apparatus according to the embodiment of the present invention.

FIG. 5 is a view exemplifying the arrangement of the operation unit 150 in the image forming apparatus 100 according to the embodiment of the present invention. The operation unit 150 serving as an input device roughly includes a UI display unit 500 and hard key operation unit 510. The UI display unit 500 includes a liquid crystal display unit, a backlight which illuminates the liquid crystal display unit, and a touch panel type input device adhered to the liquid crystal display unit.

The CPU 312 temporarily rasterizes, in the DRAM 322, an image to be displayed on the liquid crystal display unit of the UI display unit 500, and transfers the rasterized image to the liquid crystal display unit via the LCD controller 340 and panel I/F 341. Then, the liquid crystal display unit displays the operation screen. The CPU 312 turns on/off the backlight via the panel I/F.

When the user touches a specific region on the touch panel, the CPU 312 is notified via the panel I/F 341 of the coordinates of the region. The CPU 312 determines the manipulation contents of the user based on the notified coordinates and the display contents on the operation screen, and executes processing based on them. When the user presses a hard key of the hard key operation unit 510, the CPU 312 is notified via the panel I/F 341 of information indicative of this. The CPU 312 executes processing based on the notification.

The user can set a variety of copy modes such as double-sided setting, grouping, sorting, and stapling output, by an input manipulation via the operation unit 150. Note that the means of the manipulation is arbitrary such as the hard keys of the hard key operation unit 510 and soft keys displayed on the UI display unit 500. When the user presses a start button 511, in response to this the CPU 312 starts copy processing.

A human body detection sensor 512 is attached to the operation unit 150, and is, for example, an infrared sensor. The sensor may be attached to a portion of the image forming apparatus 100 other than the operation unit 150. The human body detection sensor 512 detects the body of a user who manipulates the image forming apparatus 100. For example, the human body detection sensor 512 notifies the CPU 312 via the panel I/F 341 of an ON signal when an obstacle (mainly human body) exists in front of the operation unit 150, and an OFF signal when it does not exist. Based on the notification, the CPU 312 determines whether the user is manipulating the operation unit 150.

<Copy Job Processing Sequence in Image Forming Apparatus>

Figure 12:
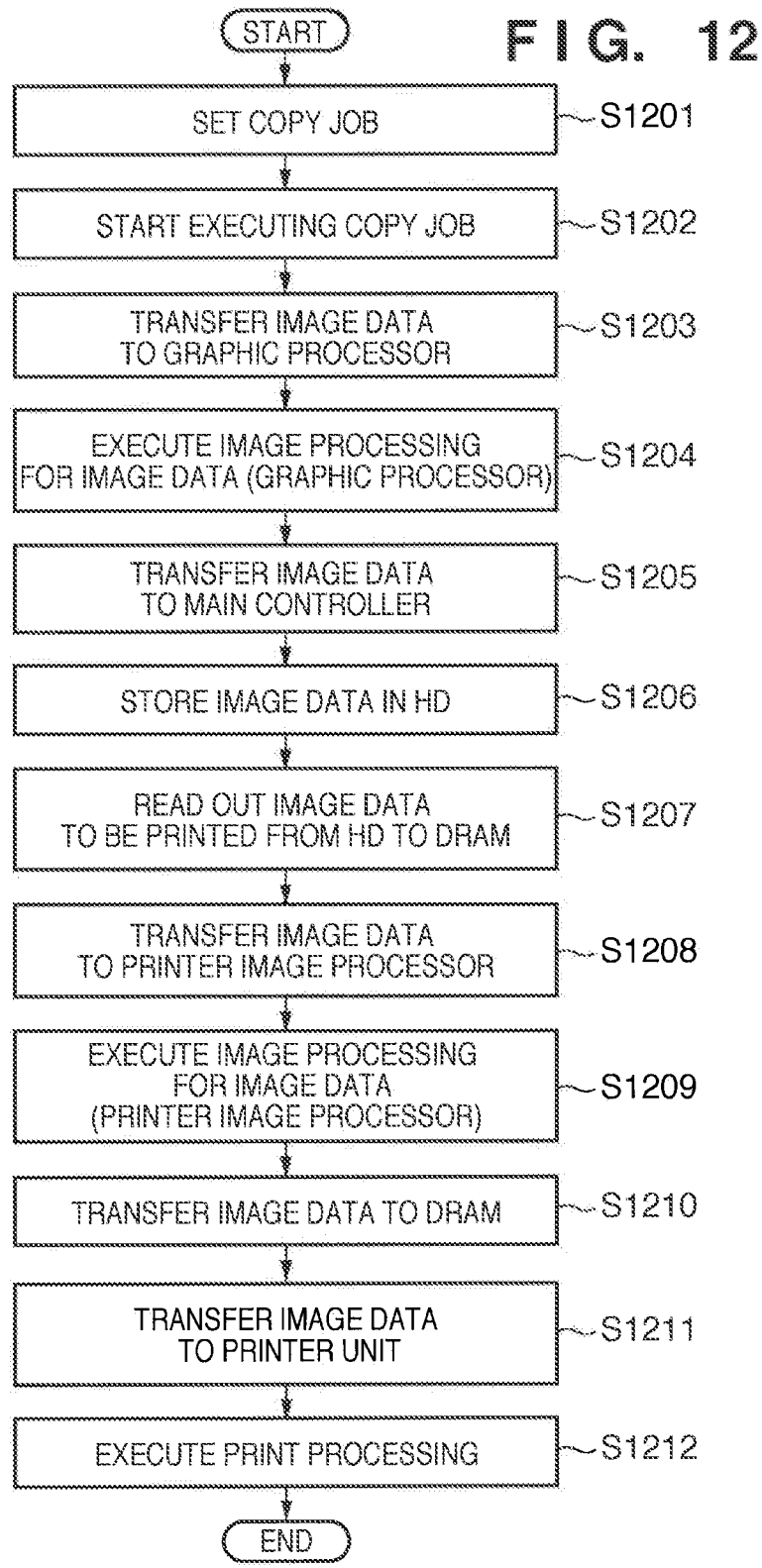
FIG. 12 is a flowchart showing a copy job processing sequence in the image forming apparatus according to the embodiment of the present invention.

The whole arrangement of the image forming apparatus 100 and the arrangements of the respective units have been exemplified. The processing sequence of a copy job which is the most basic function of the image forming apparatus 100 will be explained with reference to FIG. 12. FIG. 12 is a flowchart showing a copy job processing sequence in the image forming apparatus 100 according to the embodiment of the present invention.

At the start of copy processing, the main controller 311 makes settings concerning the copy job based on information input by the user via the operation unit 150 in step S1201. The contents of settings for the image forming apparatus 100 include the number of copies, paper size, single/double-sided printing, enlargement/reduction ratio, sorting output, and stapling.

In step S1202, the main controller 311 starts executing the copy job in response to a manipulation by the user to the operation unit 150. More specifically, the main controller 311 controls the reader unit 120 via the connector 360 to start document image reading processing. At this time, the document feeding unit 121 feeds stacked document sheets one by one to the platen glass 211, and detects the document size. Based on the detected document size, the reader unit 120 exposes and scans the document sheet, reading the document image. After that, the process shifts to step S1203.

In step S1203, the reader unit 120 transfers image data generated by reading the document to the graphic processor 351 via the scanner image processor 357. At this time, the scanner image processor 357 performs image processing such as connection processing and masking for the image data. The process then shifts to step S1204.

In step S1204, the graphic processor 351 executes image processing for the image data based on the setting contents made in step S1201. For example, when a predetermined enlargement/reduction ratio is set, the graphic processor 351 performs image data scaling processing using an image scaling unit 802. The image forming apparatus 100 according to the embodiment always reads an image at an equal ratio (100%) regardless of the enlargement/reduction ratio set in step S1201. In the image forming apparatus 100, the graphic processor 351 performs scaling processing in both the main scanning and sub-scanning directions for the image data read at an equal ratio. Upon completion of all image processes for the image data, the process shifts to step S1205.

In step S1205, the graphic processor 351 compresses the image data in an image format designated in advance, and transfers the compressed image data to the main controller 311. The main controller 311 stores the received image data in the DRAM 322. Then, the process shifts to step S1206.

In step S1206, the main controller 311 converts the image data stored in the DRAM 322 into a file format designated in advance, and stores the file in the HD drive 332. At this time, the image data is transferred from the main controller 311 to the HD drive 332 via the HD controller 331. Note that the processes in steps S1201 to S1206 are repetitively executed as long as document sheets remain on the document feeding unit 121.

Image data accumulated in the HD drive 332 till step S1206 undergo image processing for printing, and are used in print processing by the printer unit 130 in step S1207 and subsequent processes.

In step S1207, if the file of image data to be printed does not exist in the DRAM 322, the main controller 311 reads out the image data from the HD drive 332 and stores it in the DRAM 322. In step S1208, the main controller 311 transfers the image data to the printer image processor 353 via the graphic processor 357. The process then shifts to step S1209.

In step S1209, the printer image processor 353 executes image processing suited to printing for the received image data. In step S1210, the printer image processor 353 stores the image data in the DRAM 354. Thereafter, the process shifts to step S1211.

In step S1211, the controller unit 110 transfers the image data in the DRAM 354 to the printer unit 130 at an appropriate timing while controlling the printer unit 130 via the connector 355.

In step S1212, the controller unit 110 controls the printer unit 130 to print out the image data. After the end of printing all image data, the image forming apparatus 100 ends the copy job.

In the image forming apparatus 100 according to the embodiment of the present invention, the user makes settings regarding a power saving operation mode (to be described later) in advance before the start of a copy job. In print processing, the image forming apparatus 100 switches the operation mode from the normal operation mode (normal mode) to the power saving operation mode (power saving mode) based on the settings.

<Example of Display on UI Display Unit During Processing of Copy Job>

Figure 9:
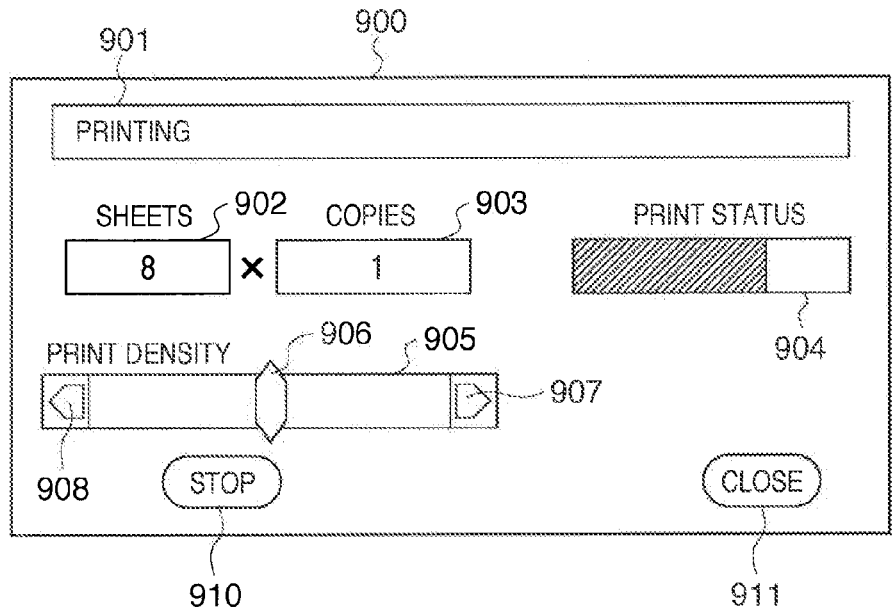
FIG. 9 is a view exemplifying a display on a UI display unit during processing of a copy job in the image forming apparatus according to the embodiment of the present invention.

FIG. 9 is a view exemplifying a display on the UI display unit 500 during processing of a copy job in the image forming apparatus 100 according to the embodiment of the present invention. When the image forming apparatus 100 starts print processing, the UI display unit 500 of the operation unit 150 displays (pop-up display) a subwindow 900 indicating that print processing is in progress. In the subwindow 900, a processing content title display portion 901, sheet count display portion 902, and copy count display portion 903 respectively display a message that printing is underway, the sheet count per copy, and the copy count. A print status display portion 904 displays the progress of print processing in a progress bar format.

A print density adjustment portion 905 is a slider capable of adjusting the print density. The user can change the print density during the print operation in the normal operation mode (to be described later) by manipulating the print density adjustment portion 905. When the user touches a button 907 or 908, a cursor pointer 906 moves toward the touched button. For example, the user can increase the density value by touching the button 907, and decrease it by touching the button 908. The DRAM 322 serving as a nonvolatile memory in the controller unit 110 stores a density value adjusted by the print density adjustment portion 905 during the print operation.

The user can stop print processing and close the subwindow 900 by touching buttons 910 and 911. During the print operation in the power saving operation mode (to be described later), the CPU 312 can turn off the backlight so as not to display the subwindow 900. Accordingly, the CPU 312 need neither update the print status display portion 904 nor react to a manipulation to the print density adjustment portion 905, thereby reducing the processing load on the CPU 312.

<Example of Power Saving Operation Mode Setting Display on UI Display Unit>

Figure 10:
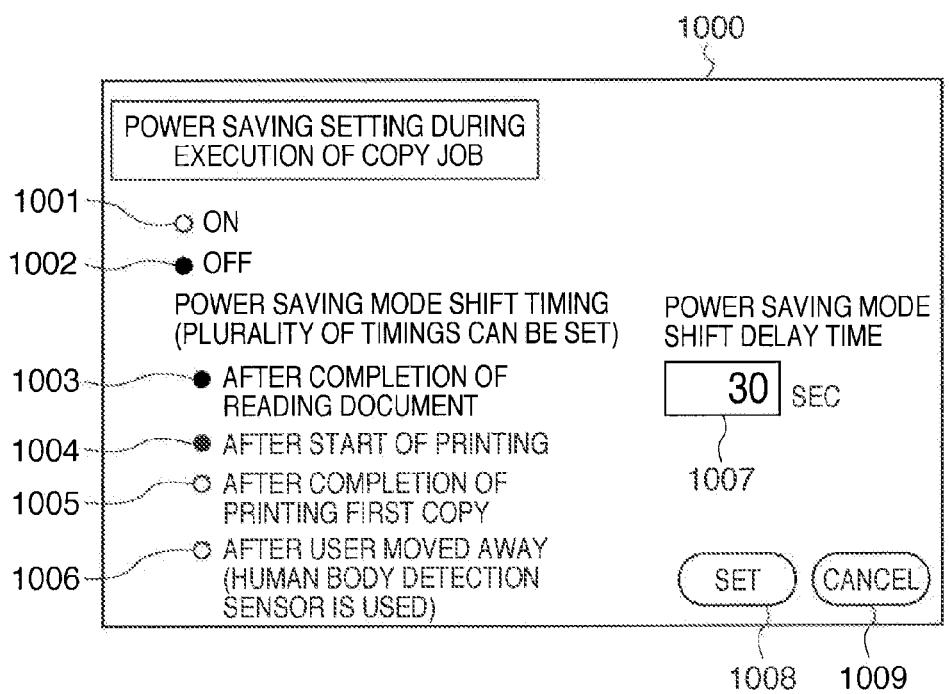
FIG. 10 is a view exemplifying a display screen displayed on the UI display unit of the operation unit to make settings concerning the power saving operation mode according to the embodiment of the present invention.

FIG. 10 is a view exemplifying a display screen displayed on the UI display unit 500 of the operation unit 150 to make settings concerning the power saving operation mode according to the embodiment of the present invention. When setting the power saving operation mode, the UI display unit 500 displays a power saving operation mode setting screen 1000 under the control of the CPU 312. In this screen, the user sets whether to shift to the power saving operation mode, the timing to shift to the power saving operation mode, and the delay time when shifting to the power saving operation mode.

By selecting either a radio button 1001 or 1002, the user sets whether to shift the image forming apparatus 100 to the power saving operation mode during execution of a copy job. The user can select only either the radio button 1001 or 1002. When the user selects the radio button 1001, the CPU 312 controls the screen display to prohibit setting the timing to shift to the power saving operation mode, and the delay time when shifting to the power saving operation mode. When the user selects the radio button 1002, the CPU 312 controls the screen display to allow setting the timing to shift to the power saving operation mode, and the delay time when shifting to the power saving operation mode.

By selecting check buttons 1003, 1004, 1005, and 1006, the user sets the timing to shift to the power saving operation mode. This setting is a condition to determine whether to shift to the power saving operation mode during execution of a copy job in the image forming apparatus 100. As shown in FIG. 10, the user can select at least one of the following four conditions. The first condition is that the image forming apparatus 100 shifts to the power saving operation mode after completion of reading a document. The second condition is that the image forming apparatus 100 shifts to the power saving operation mode after the start of executing the print operation. The third condition is that the image forming apparatus 100 shifts to the power saving operation mode after completion of printing the first copy. The fourth condition is that the image forming apparatus 100 shifts to the power saving operation mode when the human body detection sensor 512 detects that the user has moved away from the operation unit 150. When the user selects some of these conditions, the image forming apparatus 100 shifts to the power saving operation mode after satisfying all the selected conditions. Note that "after completion of printing the first copy" means "after completion of printing the first copy when printing a set of image data by a plurality of copies".

The user sets, in a numerical value input portion 1007, seconds after which the image forming apparatus 100 shifts to the power saving operation mode after the timing when the foregoing condition is satisfied. The user inputs a numerical value to the numerical value input portion 1007 using the ten-key pad of the operation unit 150.

When the CPU 312 detects that the user has touched a set button 1008, it saves information input by the user as settings regarding the power saving operation mode. More specifically, the CPU 312 stores each set value in the SRAM 339 of the controller unit 110 and updates it. The SRAM 339 operates as a nonvolatile memory because it always receives power from the backup battery 338. Even after the image forming apparatus 100 is turned off, the SRAM 339 keeps holding the set value.

When the CPU 312 detects that the user has touched a cancel button 1009, it ends the display of the power saving operation mode setting screen 1000 without updating the set value.

<Processing Sequence at Start of Copy Job>

Figure 13:
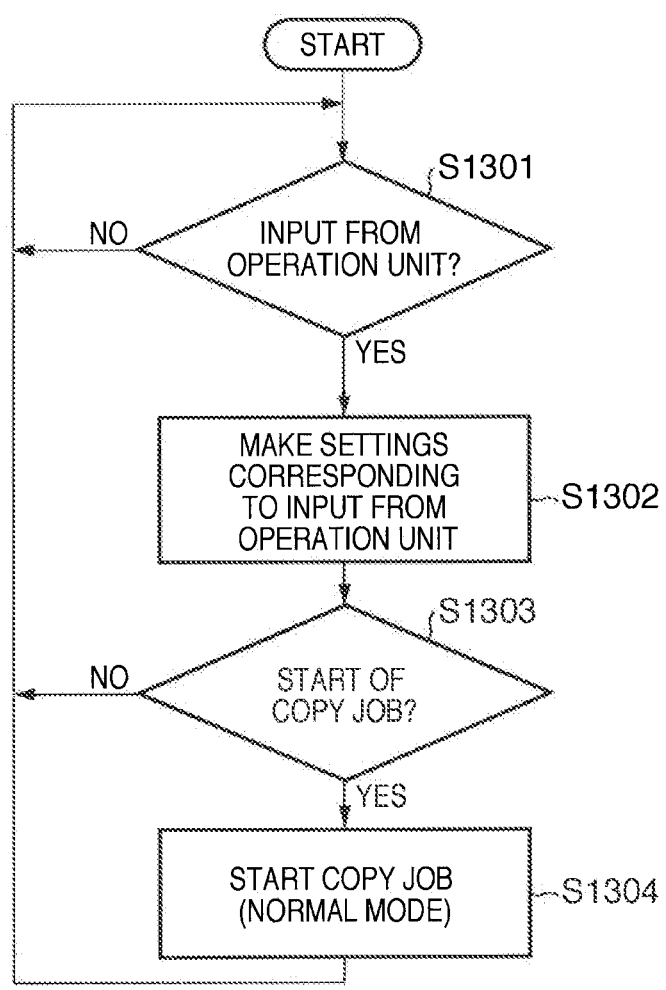
FIG. 13 is a flowchart showing a processing sequence when starting a copy job in the image forming apparatus according to the embodiment of the present invention.

A processing sequence when switching of the operation mode is introduced based on the power saving operation mode setting and a copy job is executed in the image forming apparatus 100 according to the embodiment will be described in detail. The processing is implemented by a program executed by the CPU 312 of the image forming apparatus 100 and executed as one task on the operating system. FIG. 13 is a flowchart showing a processing sequence when starting a copy job in the image forming apparatus 100 according to the embodiment of the present invention.

In step S1301, the CPU 312 monitors the presence/absence of an input from the operation unit 150 by determining whether the user has input information using the operation unit 150. If the user has input information to the operation unit 150, the process shifts to step S1302

In step S1302, the CPU 312 makes settings corresponding to the input from the operation unit 150. In addition, the CPU 312 sets its clock frequency to one corresponding to the normal operation mode. After that, the process shifts to step S1303.

In step S1303, the CPU 312 determines whether the user has pressed the start button 511 of the operation unit 150. If the CPU 312 determines that the user has pressed the start button 511, the process shifts to step S1304 to start executing the copy job in the normal operation mode. If the CPU 312 determines that the user has not pressed the start button 511, the process returns to step S1301 to monitor the presence/absence of an input from the operation unit 150.

<Processing Sequence in Normal Operation Mode>

Figure 14A:
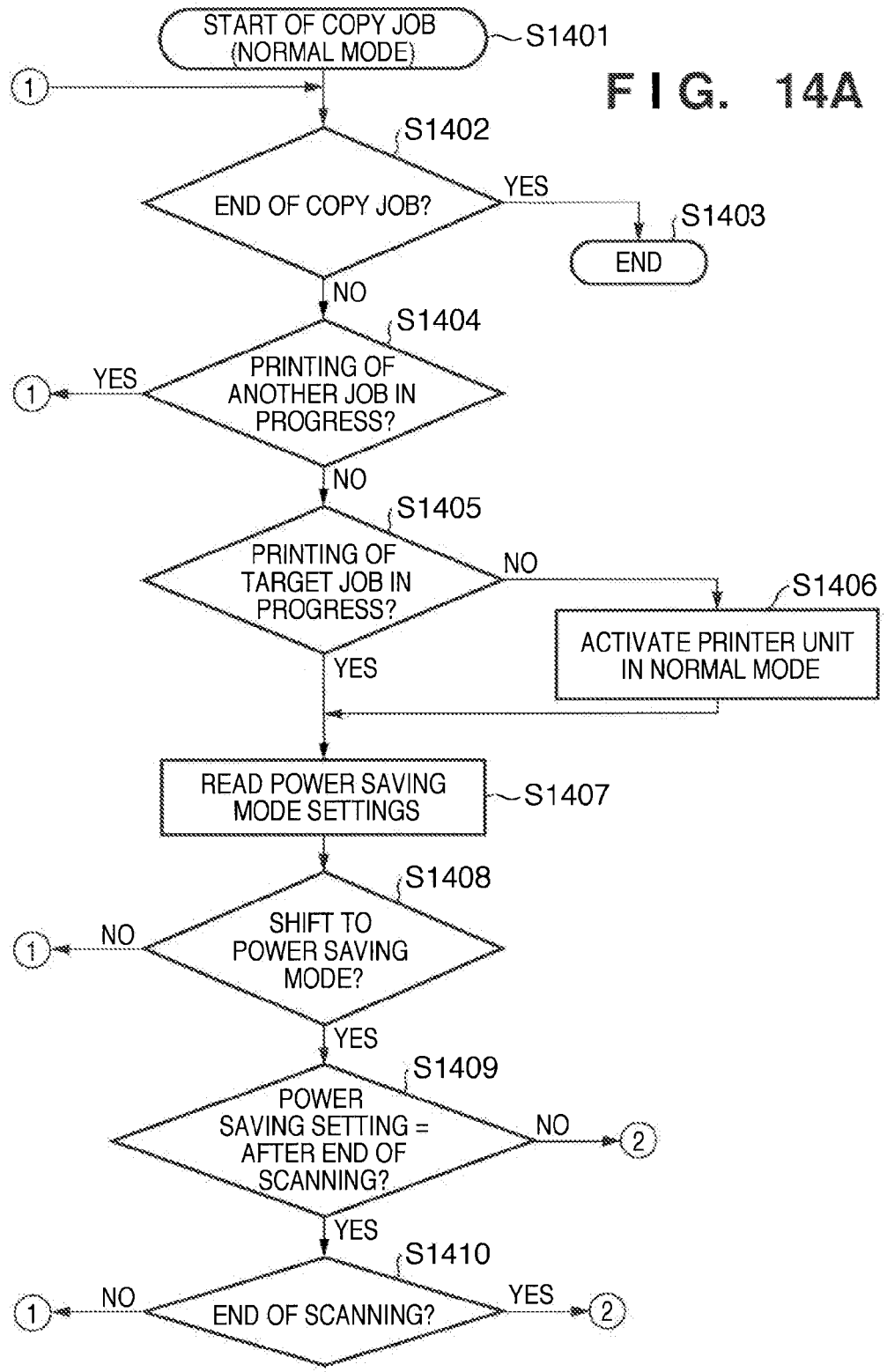
FIGS. 14A and 14B are flowcharts showing a copy job processing sequence the normal operation mode in the image forming apparatus according to the embodiment of the present invention.
Figure 14B:
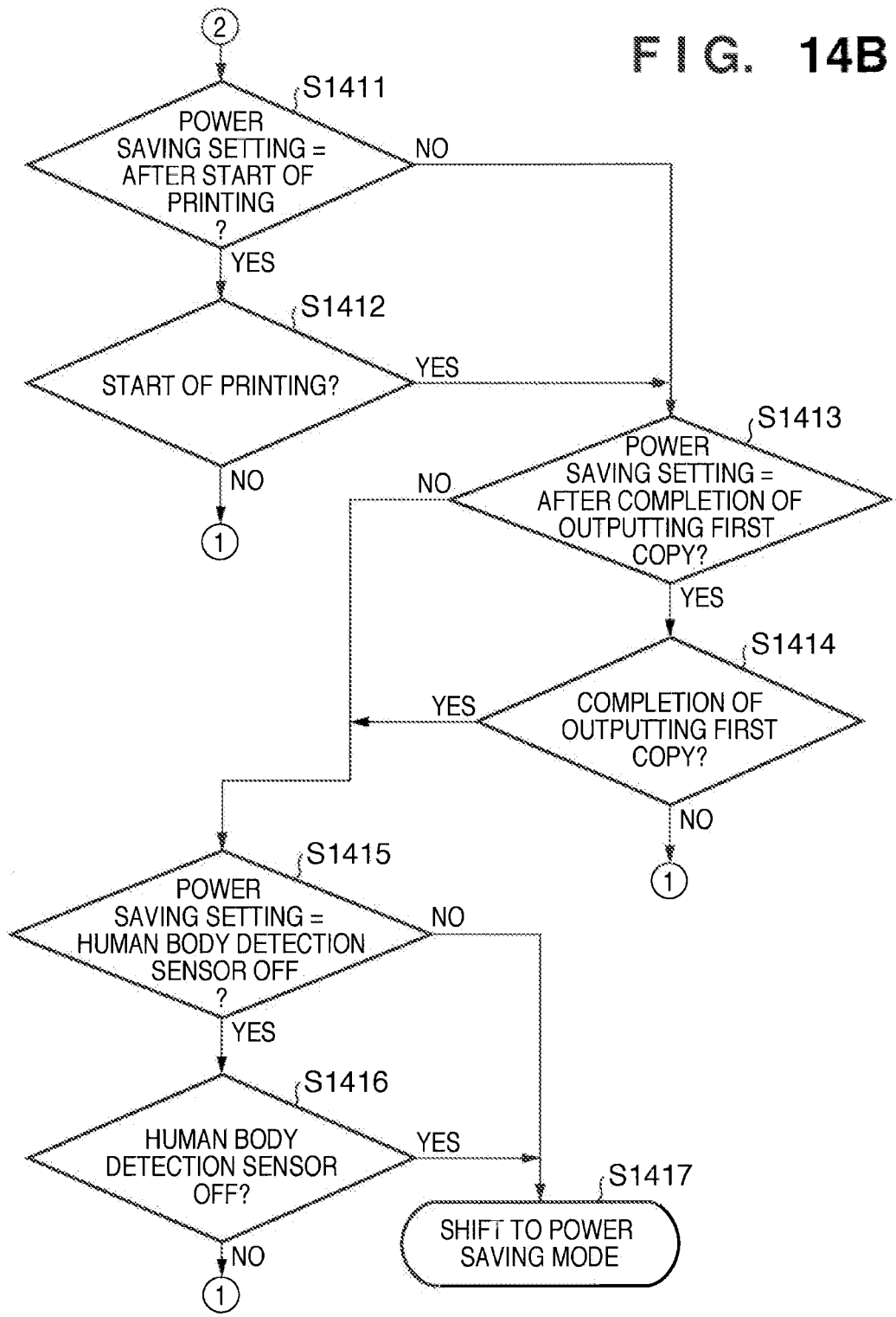

FIGS. 14A and 14B are flowcharts showing a copy job processing sequence in the normal operation mode in the image forming apparatus 100 according to the embodiment of the present invention.

In step S1401, the CPU 312 starts executing a copy job in the normal operation mode, and the process shifts to step S1402.

In step S1402, the CPU 312 determines whether the copy job including document reading and printing has ended. The end of the copy job includes not only normal completion of print processing but also cancellation by the user. If the CPU 312 determines that the copy job has ended, the process shifts to step S1403 to end execution of the job. If the CPU 312 determines that the copy job has not ended, the process shifts to step S1404.

In step S1404, the CPU 312 determines whether printing of another job is in progress. Even if printing of another job is in progress, the CPU 312 can set the copy job as a reserved job and starts execution of it. In this case, the CPU 312 cannot execute printing of the job registered as the reserved job unless a running job ends. Hence, if the CPU 312 determines in step S1404 that printing of another job is in progress, the process returns to step S1402 and waits for cancellation of the reserved job or the end of the running job. If the CPU 312 determines in step S1404 that no other job is in progress, or printing of another job is not underway because execution of it has ended, the process shifts to step S1405.

In step S1405, the CPU 312 determines whether printing of a target copy job (target job) is progress. If the CPU 312 determines that printing is in progress, the process shifts to step S1407. If the CPU 312 determines that printing is not underway, the process shifts to step S1406. Immediately after the start of the copy job, the CPU 312 has not started printing of the target job, so the process shifts to step S1406.

In step S1406, the CPU 312 activates the printer unit 130 at a normal interval between sheets and driving speed in the normal operation mode. The process then shifts to step S1407. The interval between sheets means the interval between successively conveyed printing sheets when successively printing on a plurality of printing sheets. In the embodiment, the first interval is set as an interval between sheets in the normal operation mode, and the second interval shorter than the first one is set as an interval between sheets in the power saving operation mode.

In step S1407, the CPU 312 reads, from the SRAM 339, values set in the power saving operation mode setting screen 1000 shown in FIG. 10. In steps S1408 to S1416, the CPU 312 determines, based on the set values, whether to shift to the power saving operation mode.

In step S1408, the CPU 312 determines whether the user has selected either the radio button 1001 or 1002 in the power saving operation mode setting screen 1000. From this, the CPU 312 determines whether it is set to shift to the power saving operation mode during execution of the copy job. If the CPU 312 determines not to shift to the power saving operation mode, the process returns to step S1402 to keep executing the copy job in the normal operation mode. If the CPU 312 determines to shift to the power saving operation mode, the process shifts to step S1409 to determine the timing to shift to the power saving operation mode based on conditions set in the power saving operation mode setting screen 1000.

In step S1409, the CPU 312 determines whether one condition set as the timing to shift to the power saving operation mode is "after completion of reading a document". If this condition is not set, the process shifts to step S1411 to make a determination based on the next condition. If this condition is set, the process shifts to step S1410. In step S1410, the CPU 312 determines whether reading of a document has been completed. If the CPU 312 determines that reading of a document has been completed, the process shifts to step S1411 to make a determination based on the next condition. If the CPU 312 determines that reading of a document has not been completed, the process returns to step S1402 to keep executing the copy job in the normal operation mode.

In step S1411, the CPU 312 determines whether one condition set as the timing to shift to the power saving operation mode is "after the start of printing". If this condition is not set, the process shifts to step S1413 to make a determination based on the next condition. If this condition is set, the process shifts to step S1412. In step S1412, the CPU 312 determines whether printing of a document has started. If the CPU 312 determines that printing of a document has started, the process shifts to step S1413 to make a determination based on the next condition. If the CPU 312 determines that printing of a document has not started, the process returns to step S1402 to keep executing the copy job in the normal operation mode.

In step S1413, the CPU 312 determines whether one condition set as the timing to shift to the power saving operation mode is "after completion of printing the first copy". If this condition is not set, the process shifts to step S1415 to make a determination based on the next condition. If this condition is set, the process shifts to step S1414. In step S1414, the CPU 312 determines whether printing of the first copy of the document has been completed in printing of a plurality of copies. If the CPU 312 determines that printing of the first copy of the document has been completed, the process shifts to step S1415 to make a determination based on the next condition. If the CPU 312 determines that printing of the first copy of the document has not been completed, the process returns to step S1402 to keep executing the copy job in the normal operation mode.

In step S1415, the CPU 312 determines whether one condition set as the timing to shift to the power saving operation mode is "after the user has moved away". If this condition is not set, the process shifts to step S1417. If this condition is set, the process shifts to step S1416. In step S1416, the CPU 312 determines, based on the result of detection by the human body detection sensor, whether the user has moved away from the image forming apparatus 100. If the CPU 312 determines that the user has not moved away from the image forming apparatus 100, the process returns to step S1402 to keep executing the copy job in the normal operation mode. If the CPU 312 determines that the user has moved away from the image forming apparatus 100, the process shifts to step S1417.

In step S1417, the CPU 312 shifts execution of the copy job from the normal operation mode to the power saving operation mode.

<Processing Sequence in Power Saving Operation Mode>

Figure 15:
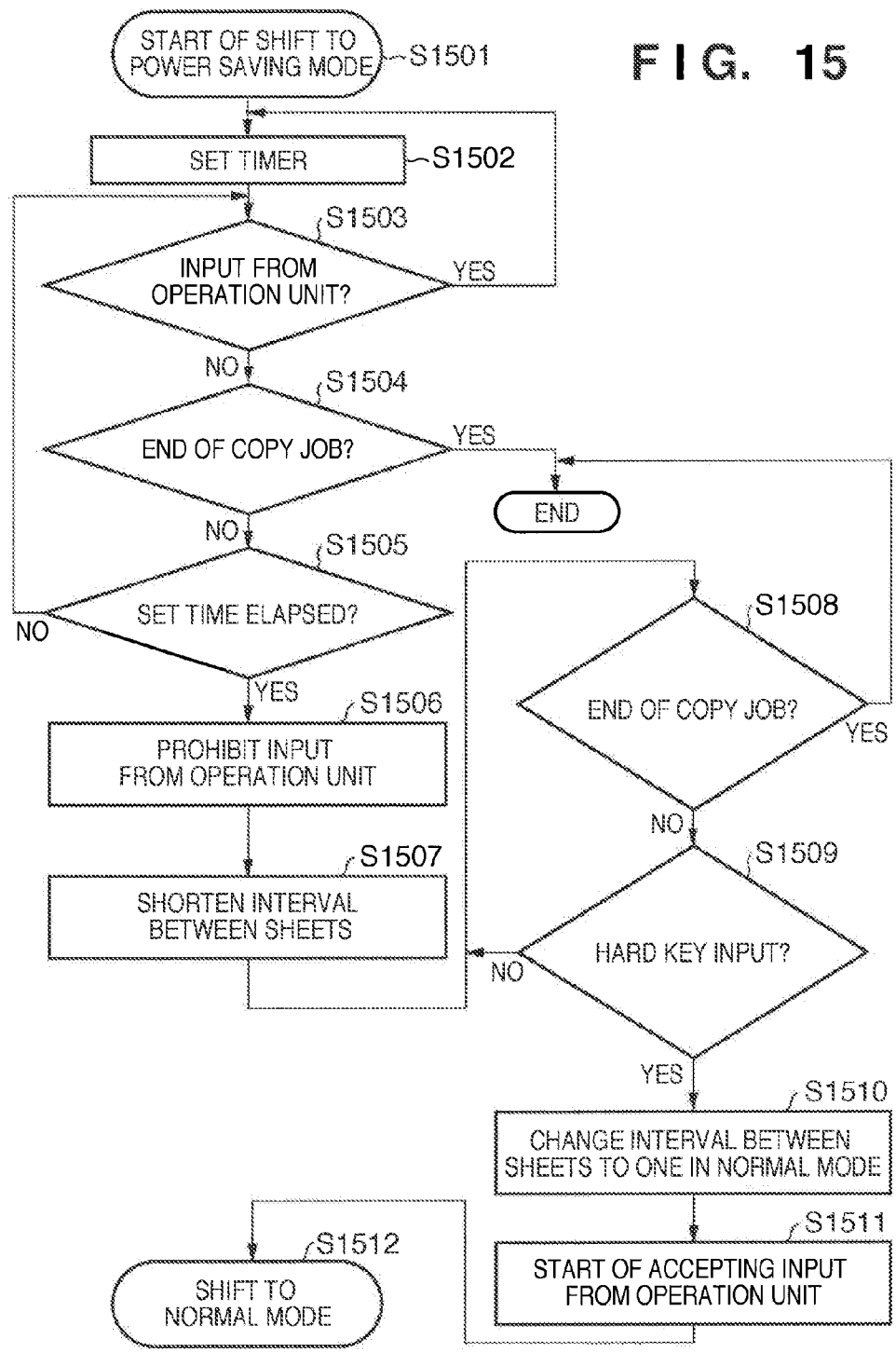
FIG. 15 is a flowchart showing a copy job processing sequence in the power saving operation mode in the image forming apparatus according to the embodiment of the present invention.

FIG. 15 is a flowchart showing a copy job processing sequence in the power saving operation mode in the image forming apparatus 100 according to the embodiment of the present invention.

In step S1501, the CPU 312 starts shifting to the power saving operation mode based on the processing in FIGS. 14A and 14B. The process then shifts to step S1502.

In step S1502, the CPU 312 sets and activates a timer based on a numerical value set at the numerical value input portion 1007 in the power saving operation mode setting screen 1000. Thereafter, the process shifts to step S1503.

In step S1503, the CPU 312 determines whether the operation unit has accepted a user input during measurement of the time by the timer. If the operation unit has accepted a user input, the process returns to step S1502 to reset the timer. By this processing, the CPU 312 does not shift to the power saving operation mode while the user manipulates the operation unit 150. If the operation unit has not accepted a user input, the process shifts to step S1504.

In step S1504, the CPU 312 determines whether the copy job has ended. If the copy job has ended, the process ends. If the copy job has not ended, the process shifts to step S1505.

In step S1505, the CPU 312 determines, based on the result of time measurement by the timer, whether the set time has elapsed. If the set time has not elapsed, the process returns to step S1503. If the set time has elapsed, the process shifts to step S1506.

In step S1506, the CPU 312 prohibits a user input by stopping acceptance of an input via the operation unit 150. Then, the process shifts to step S1507. At this time, the CPU 312 controls not to display the subwindow 900 so as not to accept a change of the density value at the print density adjustment portion 905. Also, the CPU 312 may control not to change the density value at the print density adjustment portion 905 while displaying the subwindow 900 to allow the user to confirm the progress of the job. In the embodiment, the CPU 312 prohibits only a touch panel manipulation on the UI display unit 500 and permits a key input from only the hard key operation unit 510. In step S1509 (to be described later), the user can cancel the power saving operation mode and restore the image forming apparatus 100 to the normal operation mode by a key input from the hard key operation unit 510.

In step S1507, the CPU 312 sets, as a setting in the power saving operation mode, the interval between sheets in the printer unit 130 to be shorter than that in the normal operation mode. The process then shifts to step S1508. Note that the CPU 312 may decrease the CPU clock frequency and driving voltage by turning off the backlight of the UI display unit 500 or changing the settings of the PLL 403 and CPU power supply 409 of the CPU 312. As a result, power consumption in the image forming apparatus 100 can be further reduced. If possible, power consumption may be reduced by decreasing the driving speed of the printer unit 130.

In step S1508, the CPU 312 determines whether the copy job has ended. If the copy job has ended, the process ends. If the copy job has not ended, the process shifts to step S1509.

In step S1509, the CPU 312 determines whether an input has been accepted from the hard key operation unit 510 of the operation unit 150. If no input has been accepted from the hard key operation unit 510, the process returns to step S1508 to keep executing the copy job in the power saving operation mode. If an input has been accepted from the hard key operation unit 510, the process shifts to step S1510.

In step S1510, the CPU 312 executes shift processing to the normal operation mode. More specifically, the CPU 312 changes the interval between sheets in the printer unit 130 to that in the normal operation mode. If the CPU 312 has turned off the backlight or has changed the CPU clock frequency and driving voltage in step S1507, the CPU 312 executes processing to restore them to those in the normal operation mode. Thereafter, the process shifts to step S1511.

In step S1511, the CPU 312 restarts accepting an input from the operation unit 150. The process shifts to step S1512 to keep executing the copy job in the normal operation mode. Accordingly, the process shifts to step S1401 in FIG. 14A.

<Print Density Setting Sequence in Each Operation Mode>

The image forming apparatus 100 executes image processing for an image signal based on a set value in the register of the printer image processor 353. Settings concerning the print density among those necessary for image processing in the printer image processor 353 will be especially explained with reference to FIG. 11.

Figure 11:
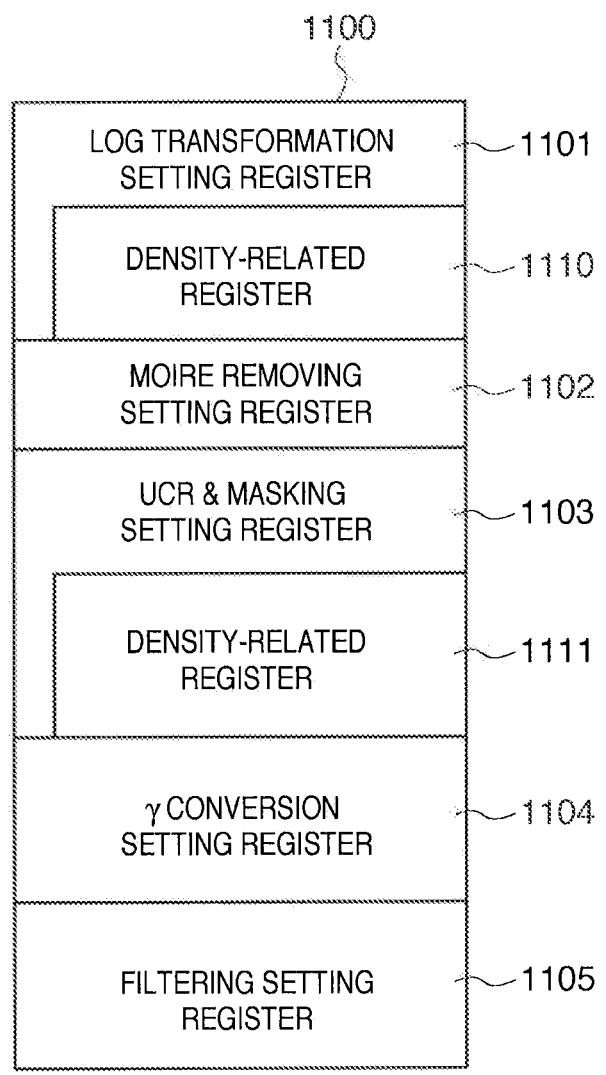
FIG. 11 is a view exemplifying the register map of the printer image processor in the image forming apparatus according to the embodiment of the present invention.

FIG. 11 is a view exemplifying the register map of the printer image processor 353 in the image forming apparatus 100 according to the embodiment of the present invention. As shown in FIG. 11, a register set 1100 is prepared in the printer image processor 353. The register set 1100 includes a LOG transformation setting register 1101, moire removing setting register 1102, UCR & masking setting register 1103, γ conversion setting register 1104, and filtering setting register 1105. These registers contained in the register set 1100 correspond to the respective image processing units 701 to 705 in FIG. 7.

The LOG transformation setting register 1101 includes a density-related register 1110. The UCR & masking setting register also includes a density-related register 1111, in the image forming apparatus 100, values set in the density-related registers 1110 and 1111 are used for density setting in print processing. More specifically, the printer image processor 353 executes image processing based on these set values, and then the printer unit performs print processing. When successively printing on a plurality of printing sheets, the set values in these registers are changed during the interval between sheets, thereby changing the print density for the next printing sheet.

Figure 16:
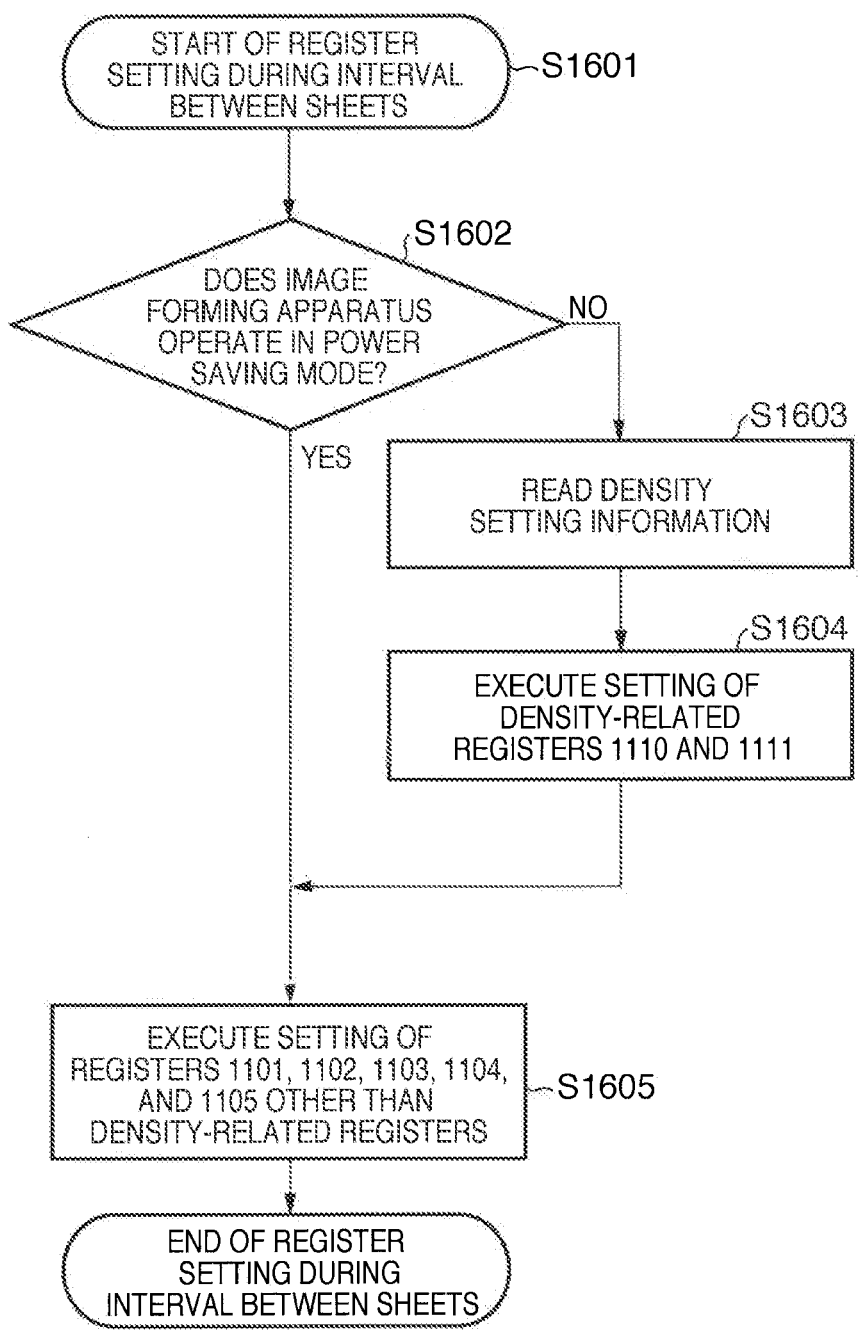
FIG. 16 is a flowchart showing a print density setting sequence in the image forming apparatus according to the embodiment of the present invention.

When the image forming apparatus 100 according to the embodiment is in the power saving operation mode, the CPU 312 omits setting of the density-related registers 1110 and 1111 in the print image processing register set 1100. This processing will be explained with reference to FIG. 16. FIG. 16 is a flowchart showing a print density setting sequence in the image forming apparatus 100 according to the embodiment of the present invention.

In step S1601, the CPU 312 starts register setting during the interval between sheets (between pages), and the process shifts to step S1602.

In step S1602, the CPU 312 determines whether the image forming apparatus 100 operates in the power saving operation mode. If the image forming apparatus 100 operates in the power saving operation mode, the process shifts to step S1605. If the image forming apparatus 100 operates not in the power saving operation mode but in the normal operation mode, the process shifts to step S1603.

(Processing in Normal Operation Mode)

In the normal operation mode, the CPU 312 sets the registers of the register set 1100 including the density-related registers 1110 and 1111. The CPU 312 reads a density value stored in the DRAM 322 in step S1603, and sets it in the density-related registers 1110 and 1111 in step S1604. The process then shifts to step S1605. In step S1605, the CPU 312 sets an unset register among the remaining registers 1101 to 1105. After that, setting of the registers ends.

(Processing in Power Saving Operation Mode)

In the power saving operation mode, the CPU 312 omits setting of the density-related registers 1110 and 1111, and sets only the remaining registers. In step S1605, the CPU 312 sets only the registers 1101 to 1105 other than the density-related registers 1110 and 1111 in the register set 1100. Thereafter, setting of the registers ends.

At the start of a copy job, the CPU 312 starts processing in the normal operation mode, so the first density setting in steps S1603 and S1604 is always executed.

<Operation Timing in Each Operation Mode>

The difference in print processing timing between the normal operation mode and the power saving operation mode will be explained with reference to FIGS. 17 to 19.

Figure 17:
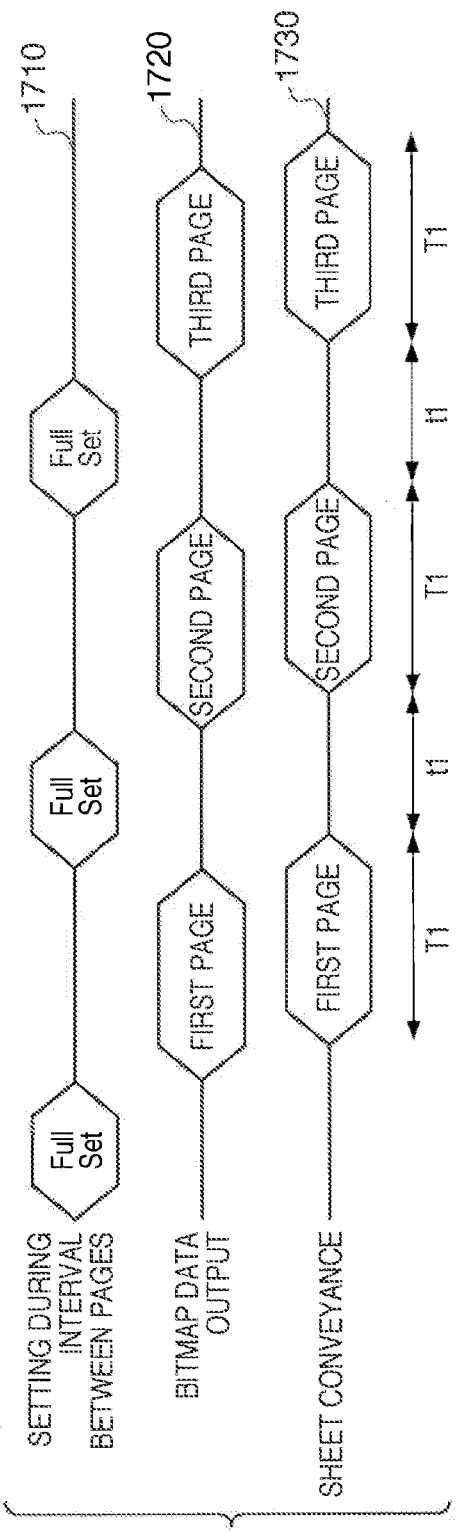
FIG. 17 is a timing chart showing operation timings in the normal operation mode in the image forming apparatus according to the embodiment of the present invention.

FIG. 17 is a timing chart showing operation timings in the normal operation mode in the image forming apparatus 100 according to the embodiment of the present invention. FIGS. 18 and 19 are timing charts showing operation timings in the power saving operation mode in the image forming apparatus 100 according to the embodiment of the present invention. FIGS. 17 to 19 show setting timings 1710, 1810, and 1910 during the interval between sheets, bitmap data output timings 1720, 1820, and 1920, and conveying timings 1730, 1830, and 1930 for a printing sheet to the transfer unit.

As shown in FIG. 17, the normal operation mode requires time t1 for setting regarding print image processing during the interval between sheets, and time T1 for conveying a printing sheet. The printer unit 130 requires power to replenish heat by an amount by which the fixing unit 277 dissipated heat in the period t1. Each driving unit of the printer unit requires power for driving at a speed capable of conveying a printing sheet in the period T1.

Figure 18:
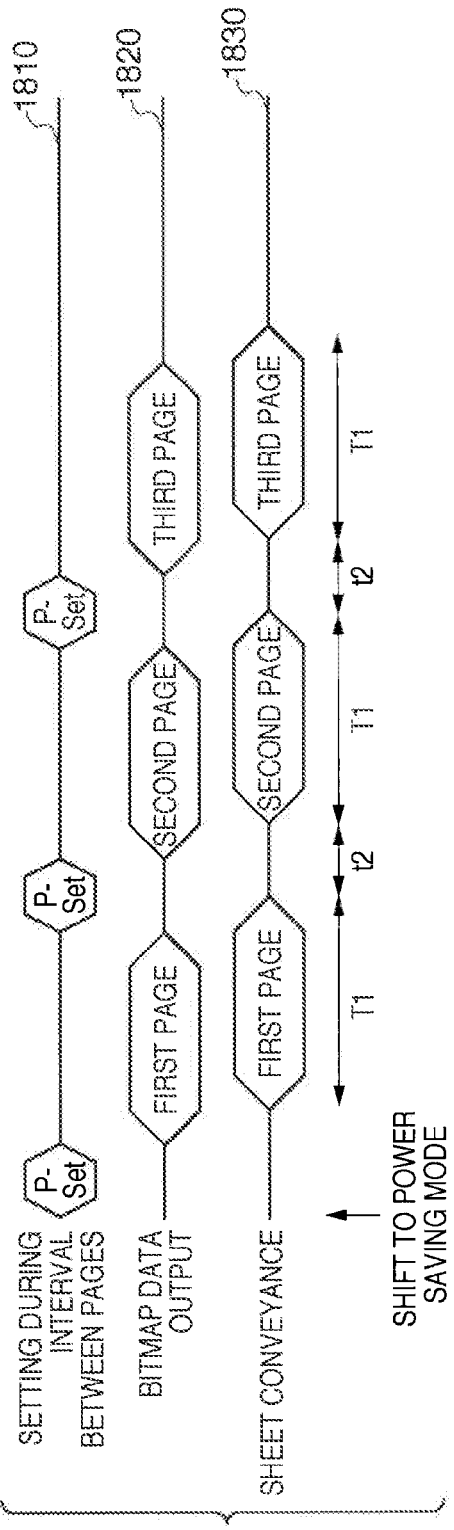
FIG. 18 is a timing chart showing operation timings in the power saving operation mode in the image forming apparatus according to the embodiment of the present invention.

In contrast, in the power saving operation mode shown in FIG. 18, the interval between sheets changes to t2 shorter than t1 while keeping the sheet conveying speed unchanged from that in the normal operation mode. Since the time t2 during which the fixing unit 277 dissipates heat is shorter than t1, the amount of heat by which the fixing unit 277 is replenished with heat becomes smaller. In the power saving operation mode shown in FIG. 18, the print speed becomes higher than that in the normal operation mode shown in FIG. 17, and power consumption can be reduced.

Figure 19:
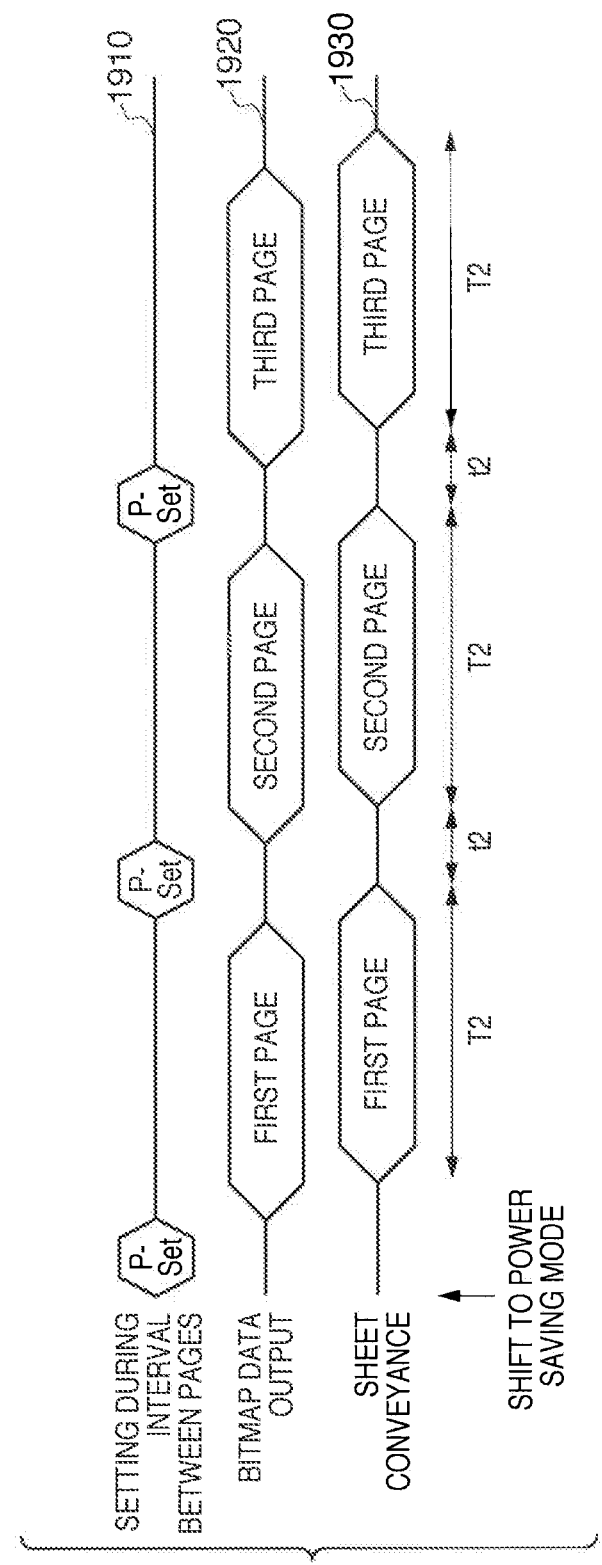
FIG. 19 is a timing chart showing operation timings in the power saving operation mode in the image forming apparatus according to the embodiment of the present invention.

In the power saving operation mode shown in FIG. 19, the interval between sheets changes to t2 shorter than t1. In addition, the sheet conveying speed is controlled to make the total print speed equal to that in the normal operation mode. In this case, T1<T2, and the sheet conveying speed decreases. Compared to the normal operation mode, the print speed does not increase, but power necessary to drive each driving unit of the printer unit becomes smaller than those in the cases of FIGS. 17 and 18. Therefore, power consumption can be further reduced.

The sheet conveying speed change processing is executed by changing the sheet conveying speed while decreasing the interval between sheets in the printer unit 130 in step S1507 of FIG. 15.

As described above, the image forming apparatus according to the embodiment switches from the normal operation mode to the power saving operation mode based on the result of determination using a preset condition, and then operates. The image forming apparatus according to the embodiment permits changing the density value during execution of an operation of forming an image in the normal operation mode. In contrast, the image forming apparatus according to the embodiment prohibits changing the density value during execution of an operation of forming an image in the power saving operation mode. This processing restricts a change of the setting associated with image formation by the CPU 312 during the interval between sheets. Thus, the interval between sheets can be shortened. Also, wasteful heat dissipation at the fixing unit can be avoided to execute efficient image formation, thereby reducing power consumption of the image forming apparatus. When switching from the normal operation mode to the power saving operation mode, the image forming apparatus according to the embodiment can further reduce power consumption by turning off the backlight of the display unit, or decreasing the CPU clock frequency or the driving speed of the printer unit.

Based on a condition set in advance by the user, the image forming apparatus according to the embodiment determines whether to switch from the normal operation mode to the power saving operation mode. Hence, a user input using the operation unit can be prohibited to reduce power consumption of the image forming apparatus without impairing user friendliness.

In the above-described embodiment, the density value when forming an image has been exemplified as an image forming condition changeable during the image forming operation. However, the image forming condition is not limited to this as long as it is directed to image processing for an image to be formed on a sheet.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-145823, filed Jun. 18, 2009, which is hereby incorporated by reference herein in its entirety.

What is claimed is:

1. An image forming apparatus comprising:
   a setting unit that sets an image forming condition for an image to be formed on a sheet;
   a conveying unit that, when conveying a plurality of sheets on which an image is to be formed on each sheet, conveys the plurality of sheets at a first interval or a second interval shorter than the first interval;
   an image forming unit that forms an image on a sheet conveyed by said conveying unit, based on the image forming condition set by said setting unit; and
   a control unit that permits changing the image forming condition set by said setting unit during execution of an operation of forming an image by said image forming unit while said conveying unit conveys the plurality of sheets at the first interval, and restricts changing the image forming condition set by said setting unit during execution of the operation of forming an image by said image forming unit while said conveying unit conveys the plurality of sheets at the second interval.

2. The apparatus according to claim 1, further comprising an operation control unit that operates the image forming apparatus in one of a normal mode and a power saving mode in which power consumption is smaller than power consumption in the normal mode,
wherein said conveying unit conveys the plurality of sheets at the first interval when the image forming apparatus operates in the normal mode, and conveys the plurality of sheets at the second interval when the image forming apparatus operates in the power saving mode.

3. The apparatus according to claim 2, wherein
said image forming unit forms a plurality of image copies, and
said operation control unit shifts the image forming apparatus from the normal mode to the power saving mode on a condition that said image forming unit has ended image formation of a first image copy among the plurality of image copies.

4. The apparatus according to claim 2, further comprising a reading unit that reads an image of a document,
wherein said image forming unit forms an image read by said reading unit on a sheet, and
said operation control unit shifts the image forming apparatus from the normal mode to the power saving mode on a condition that said reading unit has ended reading of the document.

5. The apparatus according to claim 2, wherein
said setting unit includes a display unit that displays a setting screen for setting the image forming condition, and
when shifting the image forming apparatus from the normal mode to the power saving mode by said operation control unit, said display unit is turned off.

6. The apparatus according to claim 1, wherein said conveying unit sets a conveying speed when conveying the plurality of sheets at the second interval to be lower than a conveying speed when conveying the plurality of sheets at the first interval.

7. An image forming apparatus control method, comprising the steps of:
causing a setting unit to set an image forming condition for an image to be formed on a sheet;
causing a conveying unit to, when conveying a plurality of sheets on which an image is to be formed on each sheet, convey the plurality of sheets at a first interval or a second interval shorter than the first interval;
causing an image forming unit to form an image on a sheet conveyed in the causing a conveying unit to convey the plurality of sheets step, based on the image forming condition set in the causing a setting unit to set an image forming condition step; and
causing a control unit to permit changing the image forming condition set in the causing a setting unit to set an image forming condition step, during execution of an operation of forming an image in the causing an image forming unit to form an image step, while conveying the plurality of sheets at the first interval in the causing a conveying unit to convey the plurality of sheets step, and restrict changing the image forming condition in the causing a setting unit to set an image forming condition step, during execution of the operation of forming an image in the causing an image forming unit to form an image step, while conveying the plurality of sheets at the second interval in the causing a conveying unit to convey the plurality of sheets step.

8. A non-transitory computer readable storage medium storing a program for causing a computer to execute an image forming apparatus control method defined in claim 7.

* * * * *